United States Patent
Aminaka et al.

(10) Patent No.: US 8,811,257 B2
(45) Date of Patent: Aug. 19, 2014

(54) MOBILE COMMUNICATION SYSTEM, RELAY STATION APPARATUS, BASE STATION APPARATUS, RADIO RELAY METHOD, AND COMPUTER READABLE MEDIUM

(75) Inventors: Hiroaki Aminaka, Tokyo (JP); Takahiro Sasaki, Tokyo (JP); Yasushi Maruta, Tokyo (JP)

(73) Assignee: NEC Corporation, Tokyo (JP)

( * ) Notice: Subject to any disclaimer, the term of this patent is extended or adjusted under 35 U.S.C. 154(b) by 141 days.

(21) Appl. No.: 13/504,423

(22) PCT Filed: Oct. 1, 2010

(86) PCT No.: PCT/JP2010/005922
§ 371 (c)(1),
(2), (4) Date: Apr. 26, 2012

(87) PCT Pub. No.: WO2011/052135
PCT Pub. Date: May 5, 2011

(65) Prior Publication Data
US 2012/0213145 A1    Aug. 23, 2012

(30) Foreign Application Priority Data
Oct. 27, 2009   (JP) ................................ 2009-246380

(51) Int. Cl.
*H04W 40/00*    (2009.01)
*H04W 52/02*    (2009.01)
*H04W 88/04*    (2009.01)
*H04L 5/00*     (2006.01)

(52) U.S. Cl.
CPC .......... *H04W 52/0216* (2013.01); *H04W 88/04* (2013.01); *H04L 5/0007* (2013.01)
USPC ........... 370/312; 370/230; 370/232; 370/235; 370/352

(58) Field of Classification Search
CPC ............ H04W 52/0216; H04W 52/48; H04W 56/001–56/006
USPC ......... 370/312, 230–235, 356, 390, 352, 252; 455/296, 445, 450, 561
See application file for complete search history.

(56) References Cited

U.S. PATENT DOCUMENTS

| | | | |
|---|---|---|---|
| 7,450,503 B1 * | 11/2008 | Ginjpalli et al. | 370/230.1 |
| 7,606,205 B2 * | 10/2009 | Ranta-Aho et al. | 370/335 |
| 2003/0003937 A1 * | 1/2003 | Ohkubo et al. | 455/517 |
| 2006/0030258 A1 * | 2/2006 | Mocquard et al. | 455/3.01 |

(Continued)

FOREIGN PATENT DOCUMENTS

| | | |
|---|---|---|
| CN | 101299828 A | 11/2008 |
| CN | 101388704 A | 3/2009 |

(Continued)

OTHER PUBLICATIONS

3GPP TS36.300 v9.1.0 (Sep. 2009), "Evolved Universal Terrestrial Radio Access (E-UTRA) and Evolved Universal Terrestrial Radio Access Network (E-UTRAN); Overall description; Stage 2", Sep. 2009, pp. 78-87, Chapter 15.

(Continued)

*Primary Examiner* — Dang Ton
*Assistant Examiner* — Sai Aung
(74) *Attorney, Agent, or Firm* — Sughrue Mion, PLLC

(57) ABSTRACT

In one embodiment, a relay station (11) receives a first radio signal into which transfer information to be transmitted to a mobile station (12) is encoded from a donor base station (10) through a backhaul link. When the transfer information encoded into the first radio signal is unicast information addressed to the mobile station (12), the relay station (11) decodes the unicast information and generates a third radio signal into which the unicast information is re-encoded. Further, the relay station (11) is configured such that when the transfer information encoded into the first radio signal is multicast information, the relay station (11) is able to omit decoding the multicast information. In this way, multicast information that is delayed from the predefined transmission timing is prevented from being transmitted from the relay station (11).

37 Claims, 20 Drawing Sheets

(56) References Cited

U.S. PATENT DOCUMENTS

| | | | |
|---|---|---|---|
| 2009/0086670 A1* | 4/2009 | Hart et al. | 370/329 |
| 2009/0252077 A1* | 10/2009 | Khandekar et al. | 370/312 |
| 2009/0307484 A1* | 12/2009 | Zhang et al. | 713/153 |
| 2010/0008243 A1* | 1/2010 | Viswanath et al. | 370/252 |
| 2010/0029285 A1* | 2/2010 | Horiuchi et al. | 455/445 |
| 2010/0103858 A1* | 4/2010 | Palanki et al. | 370/315 |
| 2010/0120442 A1* | 5/2010 | Zhuang et al. | 455/450 |
| 2010/0272004 A1* | 10/2010 | Maeda et al. | 370/312 |
| 2010/0273415 A1* | 10/2010 | Almgren et al. | 455/7 |
| 2011/0044223 A1* | 2/2011 | Kim et al. | 370/312 |

FOREIGN PATENT DOCUMENTS

| | | | |
|---|---|---|---|
| CN | 101516063 A | 8/2009 | |
| EP | 2068576 A1 | 6/2009 | |
| JP | 2009-182575 A | 8/2009 | |
| WO | 2009/103213 A1 | 8/2009 | |
| WO | 2009/123105 A1 | 10/2009 | |

OTHER PUBLICATIONS

Communication dated Feb. 10, 2014, issued by the European Patent Office in corresponding Application No. 10826273.4.

Office Action dated Mar. 7, 2014, issued by the State Intellectual Property Office of the P.R.C. in corresponding Chinese Application No. 201080049097.5.

* cited by examiner

MOBILE COMMUNICATION SYSTEM, RELAY STATION APPARATUS, BASE STATION APPARATUS, RADIO RELAY METHOD, AND COMPUTER READABLE MEDIUM

CROSS REFERENCE TO RELATED APPLICATION

This application is a National Stage of International Application No. PCT/JP2010/005922 filed Oct. 1, 2010, claiming priority based on Japanese Patent Application No. 2009-246380 filed Oct. 27, 2009, the contents of all of which are incorporated herein by reference in their entirety.

TECHNICAL FIELD

The present invention relates to a mobile communication system including a relay station that relays a radio signal between a base station and a mobile station, in particular to a technique for relaying multicast information to be simultaneously delivered to a plurality of mobile stations.

BACKGROUND ART

In Study Item of LTE-Advanced (Long Term Evolution Advanced) of 3GPP (3rd Generation Partnership Project), the introduction of radio relay stations (hereinafter "RNs: Relay Nodes") has been examined. The RN is one of techniques for increasing the communication speed of a mobile station (hereinafter "UE: User Equipment") located at a cell edge and for expanding cell range of a base station (hereinafter "eNB: Evolved Node B"). Note that "cell" means the coverage area of a base station.

In 3GPP, a base station (eNB: Evolved Node B) having a function of connecting with an RN is called "Donor eNB (hereinafter DeNB)". In this specification, the term "DeNB" is used to distinguish a DeNB from an ordinary eNB only when matters relating to connection with RNs and thus unique to DeNBs are explained.

Further, in this specification, a mobile station (hereinafter "UE: User Equipment") that belongs to a DeNB without any RN therebetween is called "eNB-UE". In contrast to this, a mobile station that belongs to an RN is called "RN-UE". Further, when matters common to both eNB-UEs and RN-UEs are explained, they are simply referred to as "UEs".

Further, in this specification, radio interfaces that form connections between a DeNB and an RN and between an upper RN and a lower RN are called "backhaul links". Meanwhile, radio interfaces between an eNB and an eNB-UE and between an RN and an RN-UE are called "access links". The backhaul link and the access link may use the same radio frequency (In-band mode), or may use mutually different radio frequencies (Out-band mode).

RNs can be classified according to their relay operation (according to their layer). In the simplest relay operation, amplifying and re-transmitting a radio signal transmitted from a DeNB are only performed. An RN like this, which performs a relay operation that is completed within a PHY layer, is called "Layer 1 Repeater". Layer 1 Repeater does not perform decoding and re-encoding for data transmitted from a DeNB. In contrast to this, an RN that performs decoding and re-encoding for data transmitted from a DeNB is called "Layer 2 Relay". Note that in Layer 2 Relay, scheduling of radio resources are dependent on the DeNB. An RN that has extended functions of Layer 2 Relay and thus has substantially the same functions as those of an eNB is called "Layer 2 Relay", "Layer 3 Wireless Router", "Self-backhauled eNB", or the like. Layer 3 Relay has its own cell ID and performs its own scheduling, mobility management, and so on. This specification mainly discusses Layer 2 Relays and Layer 3 Relays.

Further, in 3GPP Release 9, MBSFN (Multimedia Broadcast multicast service Single Frequency Network) is standardized. MBSFN provides MBMS (Multimedia Broadcast multicast service), which is a broadcast type service, in a SFN (Single Frequency Network). In MBSFN, plural neighboring base stations use the same frequency resource and simultaneously transmit the same multicast/broadcast data (MBMS data). In the following explanation, an MBMS-data-encoded down link signal which is synchronously transmitted from plural base stations is called "MBSFN signal".

UEs cannot distinguish an MBSFN signal simultaneously transmitted on plural cells from an MBMS signal transmitted on a signal cell. That is, an UE which located at cell boundary observes an MBSFN signal that arrives from plural cells as a multipath signal. In LTE in which an ODFM is used as the downlink communication scheme, it is necessary to design a system in such a manner that the multipath delay of an MBSFN signal remains within the guard interval of an ODFM signal in order to prevent the deterioration of the reception characteristic of the MBSFN signal. To reduce the multipath delay, plural base stations belonging to a MBSFN synchronization area transmit MBSFN signals, into which the same MBMS data is encoded, on the same time based on MBMS scheduling information.

FIG. 1 shows a logical architecture of an MBSFN. Evolved Node Bs (eNBs) 901A to 901C form cells 902A to 902C respectively, and provide an MBSFN service to an UE 903. In this specification, the cells 902A to 902C that provide an MBSFN service are called "MBSFN service cells". Meanwhile, a cell that provides an ordinary unicast service to an UE is called "unicast cell". Note that the MBMS service is provided by using the same subcarrier as that of the unicast service in a time-division manner. That is, the MBSFN service cells 902A to 902C do not provide the MBMS service at all times, but also provide a unicast service to the UE 903.

An MME 904, an MCE 905, and an MBMS GW 906 perform control of providing a MBMS service by MBSFN. The MME (Mobility Management Entity) 904 is connected with the eNBs 901A to 901C by means of an S1-MME interface, and performs mobility management and session management of the UEs 903 belonging to the cells 902A to 902C.

The MCE (Multi-cell/multicast Coordination Entity) 905 is an entity included in E-UTRAN, and is connected with the eNBs 901A to 901C by means of an M2 interface. The M2 interface is a control plane (C-Plane) interface relating to providing an MBMS service. The MCE 905 determines a radio resource (time and frequency resource), a modulation scheme, an encoding scheme, and the like that are used for an MBSFN operation of the eNBs 901A to 901C within an MBSFN synchronization area, by using the M2 interface. The MCE 905 supplies "MBMS scheduling information", which indicates the radio resource (time and frequency resource) and the like used for the MBSFN operation, to the eNBs 901A to 901C.

Further, the MCE 905 is connected to the MME 904 by means of an M3 interface. The M3 interface is a C-Plane interface between an E-UTRAN and an EPC (Evolved Packet Core). The MCE 905 starts or stops an MBMS session in response to a message indicating the start or stop of the MBMS session, issued from an EPC (specifically, from MME 904).

The MBMS GW 905 is connected with the eNBs 901A to 901C through an M1 interface. The M1 interface is a user plane (U-Plane) interface relating to providing an MBMS service. The MBMS GW 905 transmits MBMS data (MBMS packet) to the eNBs 901A to 901C by using IP multicast.

The switching between the MBSFN service and the unicast service in the MBSFN service cells 902A to 902C is carried out on a subframe basis. According to the regulations of LTE that are compatible with LTE-Advanced, the downlink transmission and the uplink transmission are carried out on a 10 ms radio frame basis. FIG. 2 shows a structural diagram of a radio frame in accordance with LTE FDD (Frequency Division Duplex). One radio frame is composed of ten subframes (#0 to #9). Each subframe is composed of two slots. Each slot is 0.5 ms in length. Each slot includes a plurality of ($N_{SYMB}$ pieces of) OFDM symbols in the time domain. A radio resource defined by one OFDM symbol in the time domain and one subcarrier in the frequency domain is called "resource element". The resource element is the minimum allocation unit of radio resources in the LTE/E-UTRAN downlink that adopts the ODFM (Orthogonal Frequency Division Multiplexing). Further, a resource unit defined by consecutive $N_{SYMB}$ OFDM symbols (equivalent to one slot) in the time domain and consecutive $N_{SC}$ OFDM subcarriers in the frequency domain is called "resource block". In the case of LTE downlink with ordinarily-used cyclic prefix, except for a case where special multipath environments need to be supported, the value of $N_{SYMB}$ is seven and the value of $N_{SC}$ is twelve.

The switching between the MBSFN service and the unicast service in the MBSFN service cells 902A to 902C is explained with reference to FIG. 3. FIG. 3 shows a specific example of scheduling of MBSFN subframes and ordinary subframes. In FIG. 3, a cell 912 is a unicast cell that does not provide the MBMS service. The MBSFN service cells 902A to 902C transmit MBMS data in predetermined subframes according to "MBMS scheduling information" supplied form the MCE 905.

For the transmission of MBMS data that is multicast information to be received by plural UEs, a MCH (Multicast channel) and a PMCH (Physical Multicast Channel) are used as the transport channel and the physical channel respectively. A subframe onto which a PMCH is mapped is called "MBSFN subframe". To make it possible to discriminate between an ordinary subframe onto which a PDSCH (Physical Downlink Shared Channel) used to transmit unicast data is mapped and a MBSFN subframe, different RSs (Reference signals) are assigned to different resource elements in these two types of subframes.

CITATION LIST

Non Patent Literature

Non patent literature 1: 3GPP TS36.330 v9.1.0 (2009-09), "Evolved Universal Terrestrial Radio Access (E-UTRA) and Evolved Universal Terrestrial Radio Access Network (E-UTRAN); Overall description; Stage 2", Chapter 15

SUMMARY OF INVENTION

Technical Problem

The inventors of the present application have found out that the following problem occurs when MBSFN transmission is to be carried out in an LTE-Advanced network environment where an RN is used. That is, when an RN transmits an MBSFN signal, an unavoidable delay time occurs in comparison to cases where a MBMS signal is transmitted from a DeNB through a direct path. Therefore, there is a possibility that the RN cannot transmit the MBMS data in accordance with a predetermined transmission schedule. The MBSFN signal that is delayed from the transmission schedule is not desirable because it could have an adverse effect on the UE, i.e., cause the deterioration of the reception characteristic of the MBSFN signal due to the increase in the multipath delay.

This problem is explained in a more detailed manner with reference to FIGS. 4 and 5. FIG. 4 is obtained by adding an RN 920 in the MBSFN architecture shown in FIG. 1. The RN 920 connects a backhaul link to the eNB (DeNB) 901A. The RN 920 receives user data transferred from the DeNB 901A through the backhaul link (BL), and transmits the user data to an UE 903 through an access link (AL). To enable the RN 920 to transmit an MBSFN signal, the DeNB 901A needs to transfer MBMS data received from an MBMS GW 906 to the RN 920 by using the backhaul link. Further, the RN 920 needs to restore the MBMS data by performing signal processing such as demodulation and channel-decoding for the radio signal of the backhaul link. Further, the RN 920 also needs to map the restored MBMS data onto a transport channel for MBMS (MCH: Multicast Channel), and to perform signal processing such as channel-encoding, modulation, and OFDM signal generation. Due to the accumulation of these delay times, there is a possibility that the RN 920 cannot transmit the MBSFN signal in accordance with the transmission schedule.

A timing chart in FIG. 5 shows a typical example in which MBSFN signal transmission by the RN 920 is not performed in accordance with the transmission schedule. At a time T1, the MBMS GW 906 multicasts MBMS data (MBMS packet) to the eNBs 901A to 901C. At a time T2, the eNB 901A transfers the MBMS data to the RN 920 through the backhaul link. At a time T3, the eNBs 901A to 901C transmit MBMS-data-encoded radio signals (MBSFN signals) in a MBSFN subframe in accordance with MBMS scheduling information. In the example shown in FIG. 5, the RN 920 requires time for the signal processing necessary for obtaining MBMS data from the backhaul radio signal and generating an MBSFN signal into which the MBMS data is encoded. As a result, the RN 920 cannot perform the transmission according to the MBMS scheduling information at the time T3. The RN 920 transmits the MBMS signal at a time T4, which is later than the schedule.

The present invention has been made based on the above-described finding by the inventors, and an object thereof is to provide, in a network including a relay station that relays a radio signal between a base station and a mobile station, a mobile communication system, an apparatus, a method, and a program, capable of preventing an MBSFN signal that is delayed from a predefined transmission timing from being transmitted from the relay station.

Solution to Problem

In a first aspect of the present invention, a mobile communication system includes a first base station and a relay station that relays a radio signal between the first base station and a mobile station. The first base station is configured to (i) transmit, in a first frame, a first radio signal into which transfer information to be transmitted to the mobile station through the relay station is encoded, and (ii) transmit, in a second frame, a second radio signal into which first multicast information to be received by a plurality of nodes is encoded, at a transmission timing synchronized with that of a neighbor base station. The relay station is configured to be able to receive the first radio signal. The relay station is also configured such that (i) when the transfer information encoded into the first radio signal is unicast information addressed to the mobile station, the relay station decodes the unicast information from the first radio station and transmits a third radio signal into which the unicast information is encoded to the mobile station, and (ii) when the transfer information encoded into the first radio signal is second multicast information having a same content as that of the first multicast information, the relay station is able to omit decoding the second multicast information from the first radio signal.

In a second aspect of the present invention, a mobile communication system includes a first base station and a relay station that relays a radio signal between the first base station and a mobile station. The first base station is configured to (i) transmit, in a first frame, a first radio signal into which unicast information to be transmitted to the mobile station through the relay station is encoded, and (ii) transmit, in a second frame, a second radio signal into which multicast information to be received by a plurality of nodes is encoded, at a transmission timing synchronized with that of a neighbor base station. The relay station is configured to (i) upon receiving the first radio signal transmitted in the first frame, decode the unicast information from the first radio signal and transmit a third radio signal into which the unicast information is encoded to the mobile station, and (ii) upon receiving the second radio signal transmitted in the second frame, amplify and re-transmit the second radio signal without decoding the multicast information from the second radio signal.

In a third aspect of the present invention, a mobile communication system includes a first base station and a relay station that relays a radio signal between the first base station and a mobile station. The first base station is configured to (i) transmit, in a first frame, a first radio signal into which transfer information to be transmitted to the mobile station through the relay station is encoded, and (ii) transmit, in a second frame, a second radio signal into which first multicast information to be received by a plurality of nodes is encoded, at a transmission timing synchronized with that of a neighbor base station. The transfer information includes second multicast information having a same content as that of the first multicast information. The relay station is configured to transmit, to the mobile station, a third radio signal into which the second multicast information decoded from the first radio signal is re-encoded, in synchronization with the transmission timing. Further, the first base station is configured to transmit the first radio signal into which the second multicast information is encoded, at a timing that is earlier than the transmission of the second radio signal into which the first multicast information is encoded, by a margin time that is longer than a delay time required for relay processing of the second multicast information performed by the relay station.

In a fourth aspect of the present invention, a mobile communication system includes a first base station and a relay station that relays a radio signal between the first base station and a mobile station. The first base station is configured to (i) transmit, in a first frame, a first radio signal into which transfer information to be transmitted to the mobile station through the relay station is encoded, and (ii) transmit, in a second frame, a second radio signal into which first multicast information to be received by a plurality of nodes is encoded, at a transmission timing synchronized with that of a neighbor base station. The relay station is configured to (i) receive the first radio signal transmitted in the first frame, decode the transfer information from the first radio signal, and transmit a third radio signal into which the transfer information is encoded to the mobile station. Further, the transfer information includes unicast information addressed to the mobile station and does not include the multicast information that needs to be transmitted in synchronization with the transmission timing.

In a fifth aspect of the present invention, a relay station apparatus that relays a radio signal between a first base station and a mobile station is provided. The first base station is configured to (i) transmit, in a first frame, a first radio signal into which transfer information to be transmitted to the mobile station through the relay station apparatus is encoded, and (ii) transmit, in a second frame, a second radio signal into which first multicast information to be received by a plurality of nodes is encoded, at a transmission timing synchronized with that of a neighbor base station.

The relay station apparatus includes a first communication unit, a downlink data processing unit, and a second communication unit. The first communication unit is configured to be able to receive the first radio signal. The downlink data processing unit is able to decode the transfer information from the first radio signal received by the first communication unit, and generate a third radio signal into which the transfer information is re-encoded. The second communication unit is configured to be able to transmit the third radio signal to the mobile station. Further, the downlink data processing unit is configured such that (i) when the transfer information is unicast information addressed to the mobile station, the downlink data processing unit decodes the unicast information from the first radio station, and (ii) when the transfer information encoded into the first radio signal is second multicast information having a same content as that of the first multicast information, the downlink data processing unit is able to omit decoding the second multicast information from the first radio signal.

In a sixth aspect of the present invention, a relay station apparatus that relays a radio signal between a first base station and a mobile station is provided. The relay station apparatus includes a first communication unit, a downlink data processing unit, and a second communication unit. The first communication unit is configured to be able to receive a first radio signal into which unicast information to be transmitted to the mobile station is encoded and which is transmitted from the first base station in a first frame. The first communication unit is also configured to be able to receive a second radio signal into which multicast information to be received by a plurality of nodes is encoded and which is transmitted from the first base station in a second frame at a transmission timing synchronized with that of a neighbor base station. The downlink data processing unit is able to decode the unicast information from the first radio signal received by the first communication unit, and generate a third radio signal into which the unicast information is re-encoded. The second communication unit is configured to be able to transmit the third radio signal to the mobile station, and to amplify and re-transmit the second radio signal without going through a process of decoding the multicast information from the second radio signal.

In a seventh aspect of the present invention, a base station apparatus is provided. The base station apparatus is configured to (i) transmit, in a first frame, a first radio signal into which transfer information to be transmitted to the mobile station through the relay station is encoded, and (ii) transmit, in a second frame, a second radio signal into which first multicast information to be received by a plurality of nodes is encoded, at a transmission timing synchronized with that of a neighbor base station. The transfer information includes second multicast information having a same content as that of the first multicast information. Further, the base station apparatus is configured to transmit the first radio signal into which the second multicast information is encoded, at a timing that is earlier than the transmission of the second radio signal into which the first multicast information is encoded, by a margin time that is longer than a delay time required for relay processing of the second multicast information performed by the relay station.

In an eighth aspect of the present invention, a radio relay method performed by a relay station that relays a radio signal between a first base station and a mobile station is provided. The first base station is configured to (i) transmit, in a first frame, a first radio signal into which transfer information to be transmitted to the mobile station through the relay station is encoded, and (ii) transmit, in a second frame, a second radio signal into which first multicast information to be received by a plurality of nodes is encoded, at a transmission timing synchronized with that of a neighbor base station.

The method includes:
(a) receiving the first radio signal;
(b) when the transfer information encoded into the received first radio signal is unicast information addressed to the mobile station, decoding the unicast information and generating a third radio signal into which the unicast information is re-encoded;
(c) when the transfer information encoded into the first radio signal is second multicast information having a same content as that of the first multicast information, omitting decoding the second multicast information from the first radio signal; and
(d) transmitting the third radio signal to the mobile station.

In a ninth aspect of the present invention, a radio relay method performed by a relay station that relays a radio signal between a first base station and a mobile station is provided. The method includes:
(a) receiving a first radio signal into which unicast information to be transmitted to the mobile station is encoded and which is transmitted from the first base station in a first frame;
(b) decoding the unicast information from the received first radio signal, and generating a third radio signal into which the unicast information is re-encoded;
(c) transmitting the third radio signal to the mobile station;
(d) receiving a second radio signal into which multicast information to be received by a plurality of nodes is encoded and which is transmitted from the first base station in a second frame at a transmission timing synchronized with that of a neighbor base station; and
(e) amplifying and re-transmitting the second radio signal without going through a process of decoding the multicast information from the second radio signal.

In a tenth aspect of the present invention, a program that causes a computer to perform signal processing relating to a relay station that relays a radio signal between a first base station and a mobile station is provided. The first base station is configured to (i) transmit, in a first frame, a first radio signal into which transfer information to be transmitted to the mobile station through the relay station apparatus is encoded, and (ii) transmit, in a second frame, a second radio signal into which first multicast information to be received by a plurality of nodes is encoded, at a transmission timing synchronized with that of a neighbor base station.

The signal processing performed by the computer running the program includes:
(a) when the transfer information encoded into the first radio signal received by the relay station is unicast information addressed to the mobile station, decoding the unicast information and generating a digital transmission signal into which the unicast information is re-encoded; and
(b) when the transfer information encoded into the first radio signal is second multicast information having a same content as that of the first multicast information, omitting decoding the second multicast information.

Advantageous Effects of Invention

According to the present invention, it is possible to provide, in a network including a relay station that relays a radio signal between a base station and a mobile station, a mobile communication system, an apparatus, a method, and a program, capable of preventing an MBSFN signal that is delayed from a predefined transmission timing from being transmitted from the relay station.

DESCRIPTION OF EMBODIMENTS

Specific illustrative embodiments of a mobile communication system suited for cases where MBSFN transmission is performed in a network including a relay station that relays a radio signal between a base station and a mobile station are explained hereinafter in detail with reference to the drawings. The same signs are assigned to the same components throughout the drawings, and duplicate explanation is omitted as appropriate for clarifying the explanation.

Further, although each of the following illustrative embodiments is explained by using an LTE-Advanced system as an example, the techniques shown in these illustrative embodiments can be also applied to mobile communication systems other than the LTE-Advanced system.

First Illustrative Embodiment

Figure 1:
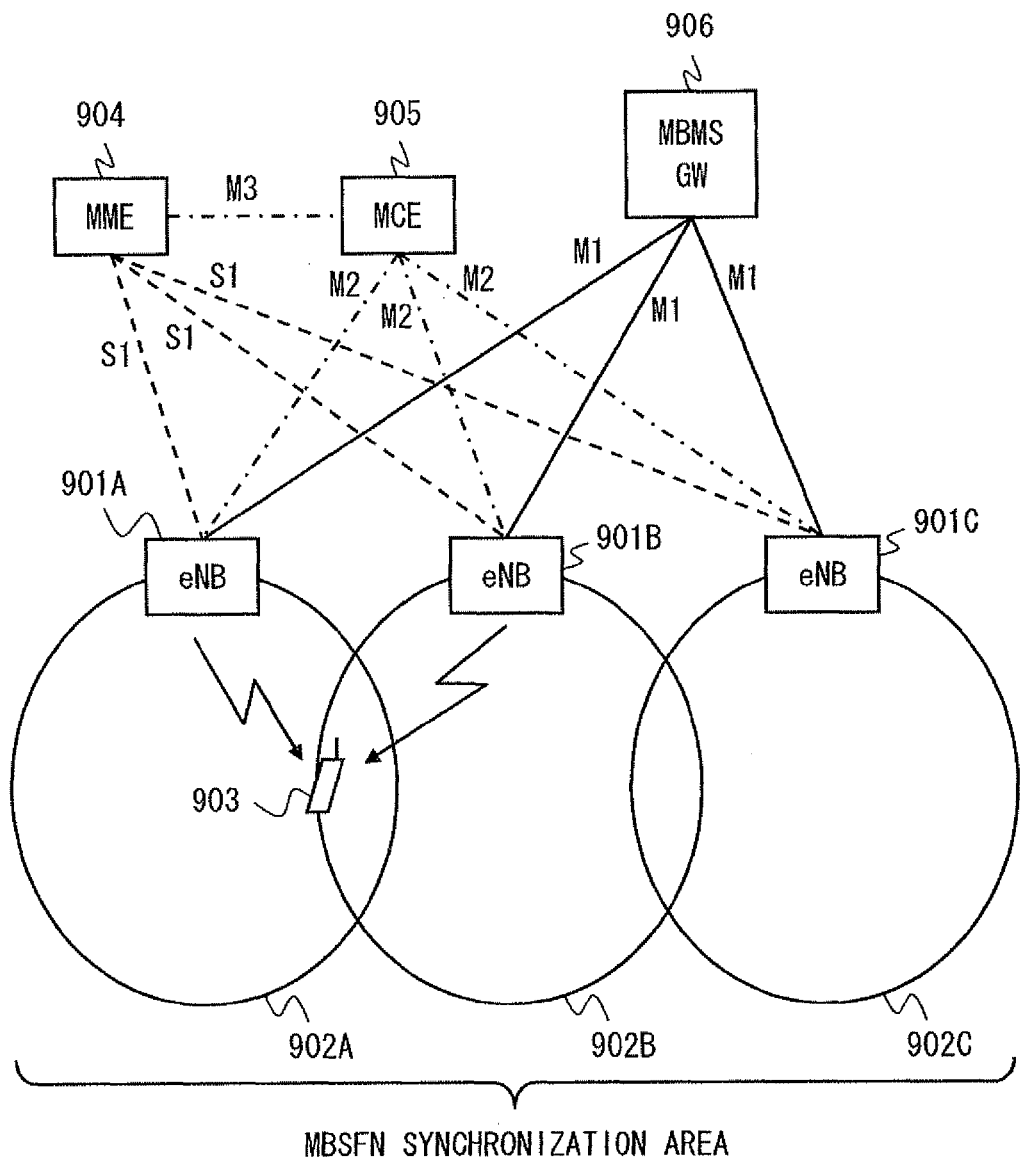
FIG. 1 shows a logical architecture of an MBSFN.
Figure 2:
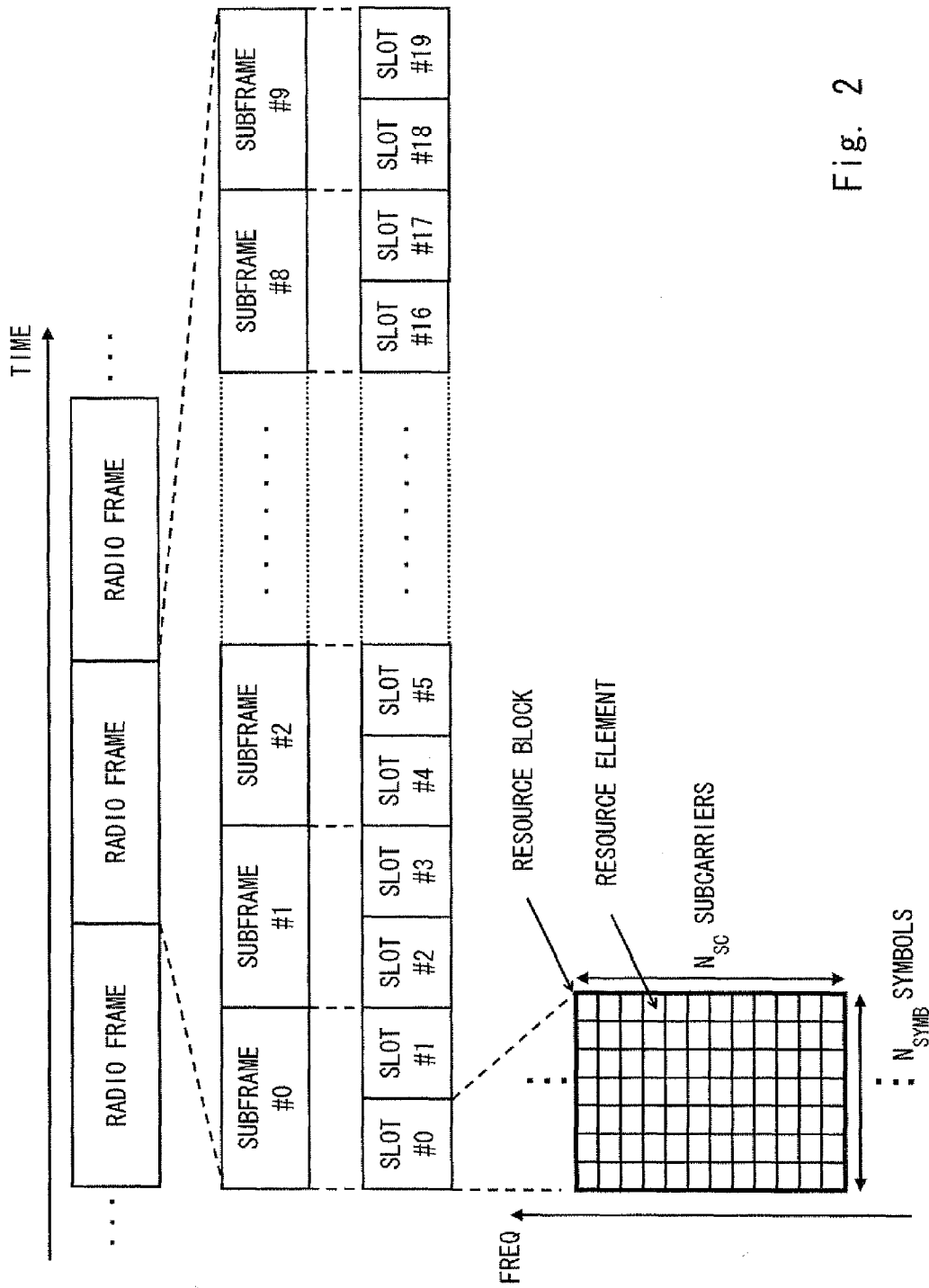
FIG. 2 shows a structural diagram of a radio frame in accordance with LTE FDD.
Figure 3:
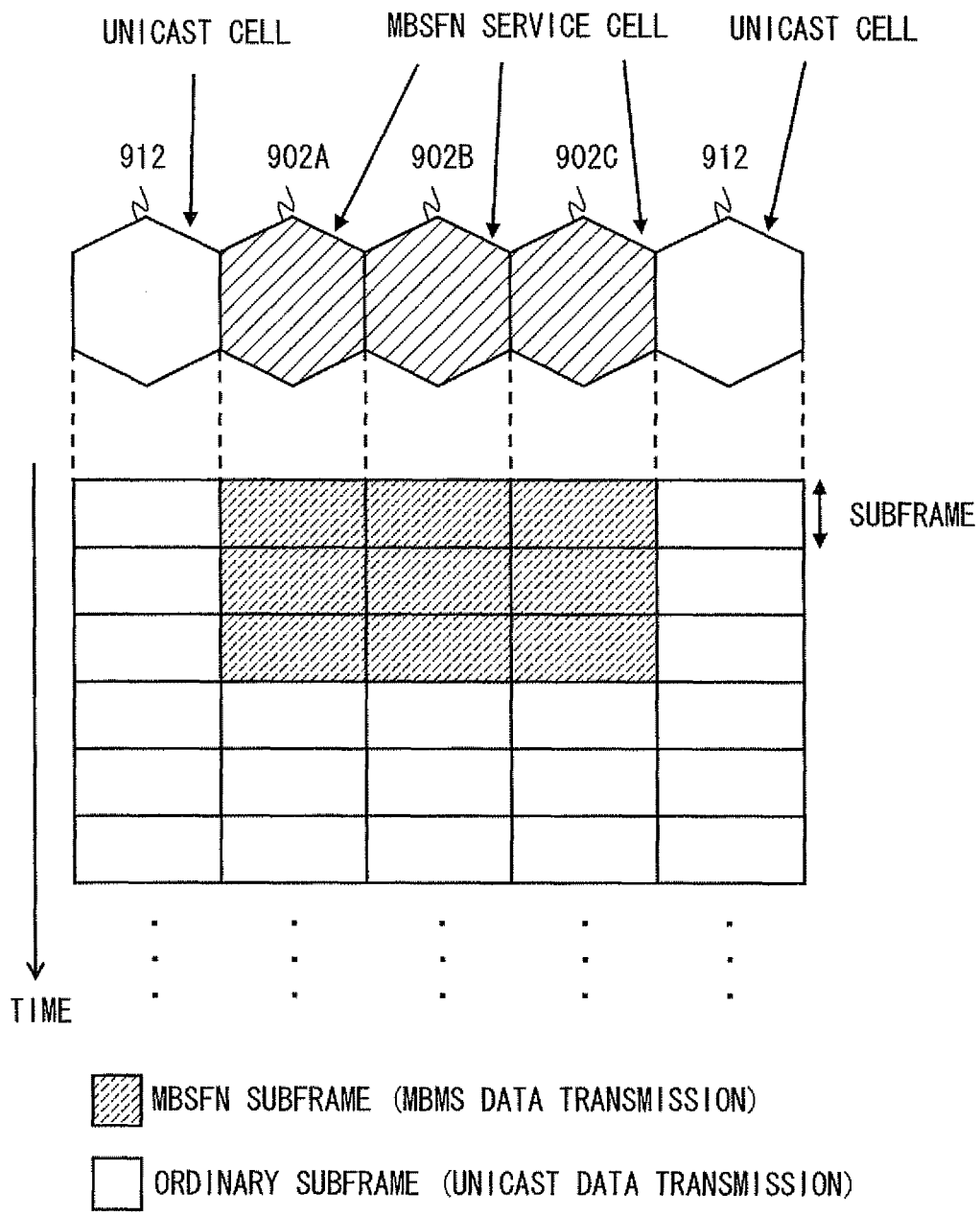
FIG. 3 shows a specific example of scheduling of MBSFN subframes and ordinary subframes.
Figure 4:
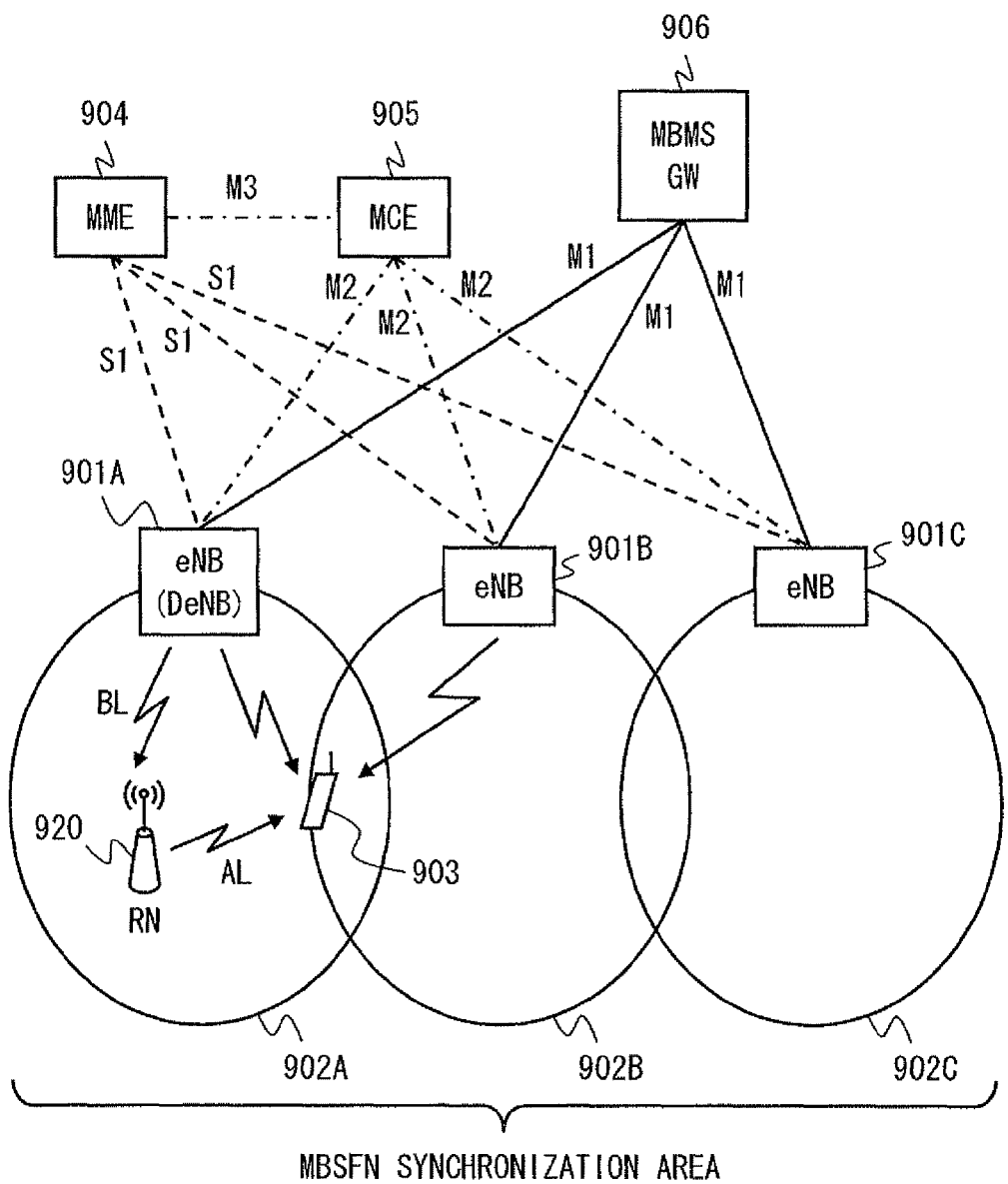
FIG. 4 shows an example of a network configuration that is used to perform MBSFN transmission by using an RN.
Figure 5:
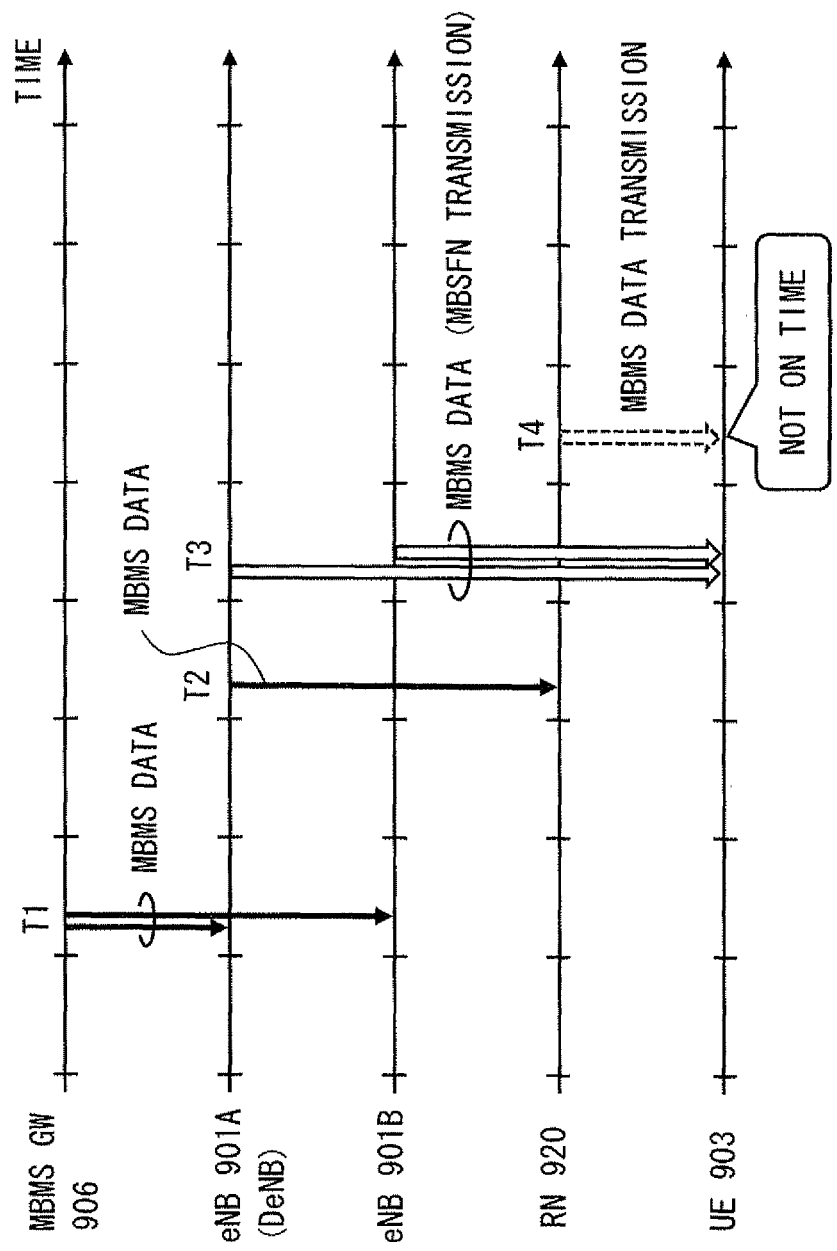
FIG. 5 is a timing chart showing MBSFN transmission performed by using an RN.
Figure 6:
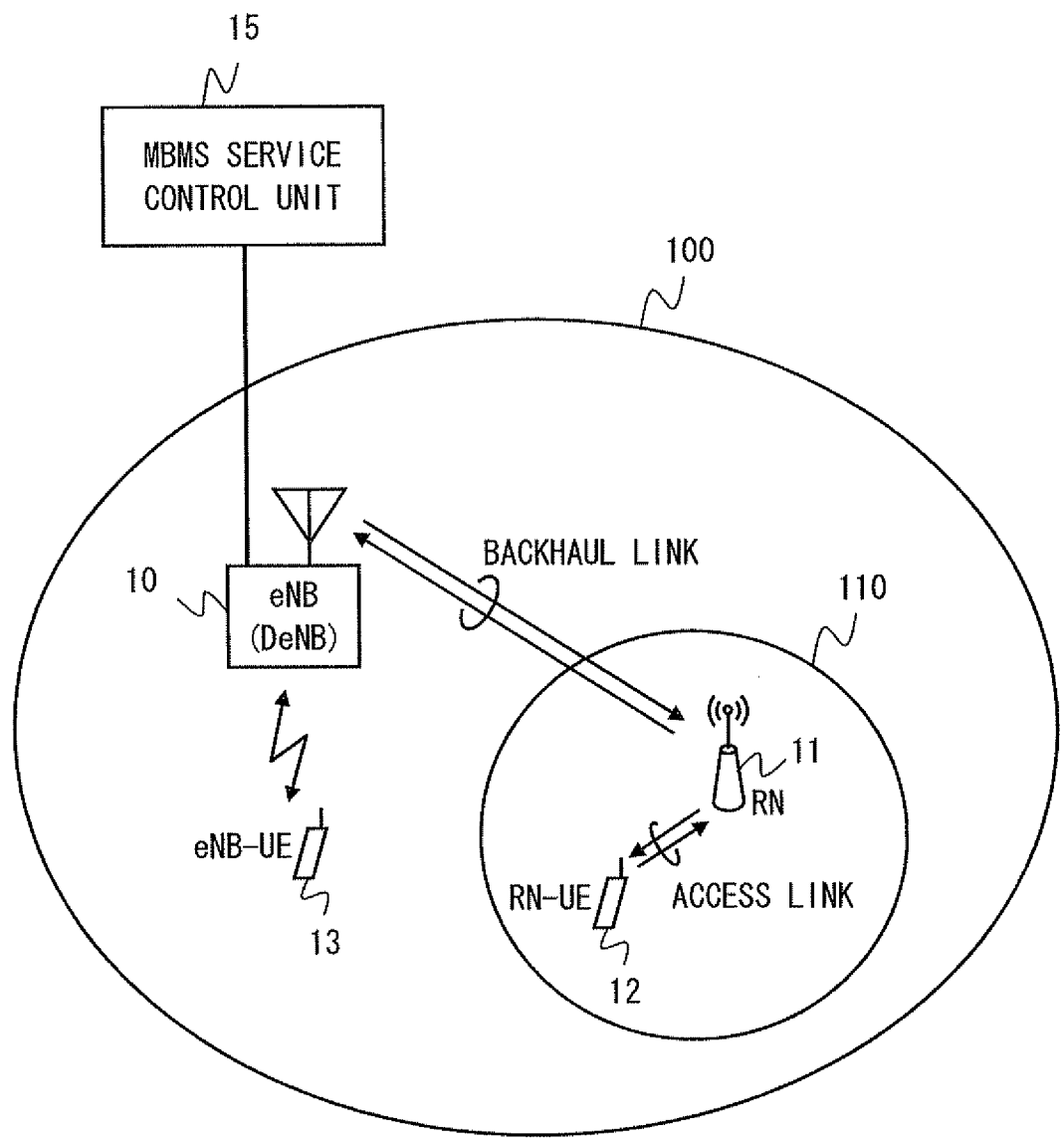
FIG. 6 is a configuration example of a mobile communication system according to a first illustrative embodiment of the present invention.

FIG. 6 shows a configuration example of a mobile communication system according to this illustrative embodiment. Although only one RN 11, one RN-UE 12, and one eNB-UE 13 are shown in FIG. 6, the number of each of these devices can be more than one. The mobile communication system according to this illustrative embodiment is an LTE-Advanced system including an RN, and has extended functions to perform MBSFN transmission. A base station (DeNB) 10 forms a base station cell (eNB cell) 100 and performs downlink and uplink communication with an eNB-UE 13. Further, the eNB 10 is a DeNB having a function to connect with an RN, and connects a backhaul link with the RN 11.

The RN 11 forms a relay station cell (RN cell) 110 and performs downlink and uplink communication with the RN-UE 12 through an access link. Note that the downlink radio frequency of the backhaul link and the downlink radio frequency of the access link may be different from each other. The RN 11 receives a radio signal transmitted from the DeNB 10 through the backhaul link, restores a bit sequence of a physical channel by performing DFT (Discrete Fourier Transform) and demodulation (symbol demapping), restores a bit sequence of a transport channel by performing signal processing such as channel decoding for a data sequence of the physical channel, and acquires transfer information that is transmitted from the DeNB 10 and contained in the restored transport channel. Further, the RN 11 generates a radio signal to be sent to the access link by mapping the acquired transfer information onto a transport channel that is used to transmit the acquired information to the RN-UE 12 and performing signal processing such as channel encoding, modulation, and ODFM signal generation (IDFT: Inverse Discrete Fourier Transform). Note that the content of the transfer information is different depending on the layer on which the RN 11 terminates. The transfer information may be, for example, transport channel data, logical channel data, or user data (IP packet). Similarly to the downlink signal relay, the RN 11 also performs a transfer process including decoding and re-encoding for an uplink signal received from the RN-UE 12.

An MBMS service control unit 15 supplies MBMS data to the DeNB 10, and transmits, to the DeNB 10, MBMS scheduling information specifying the transmission timing (i.e., transmission subframe) of an MBSFN signal into which the MBMS data is encoded. That is, the MBMS service control unit 15 has the functions of the above-described MCE and MBMS-GW. The functions of the MBMS service control unit 15 may be divided and placed in a radio access network (E-UTRAN) and a core network (EPC). The MBMS service control unit 15 may be implemented by one or plural computers. Further, the MBMS service control unit 15 may include a router that performs IP packet transfer.

Figure 7:
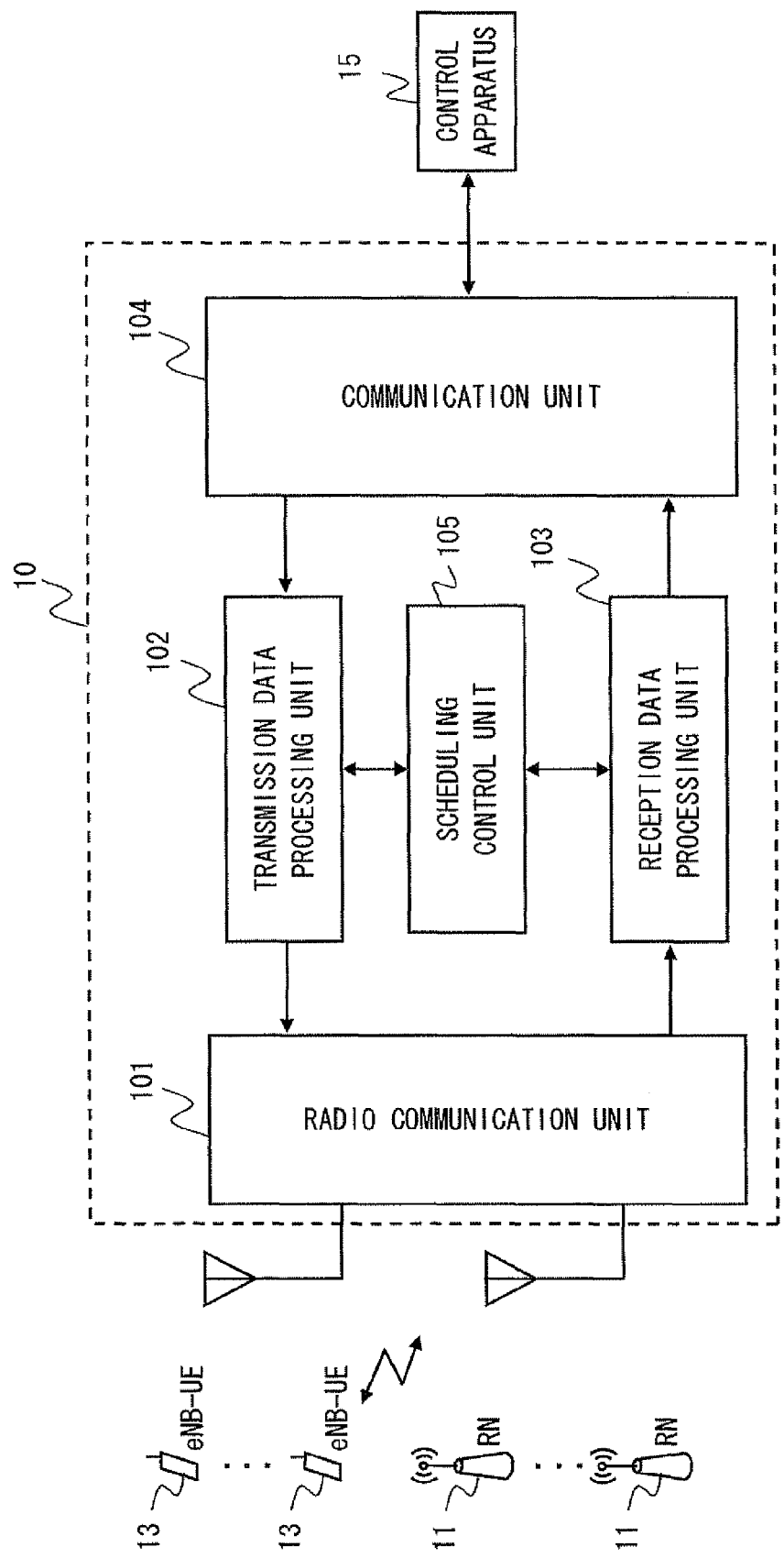
FIG. 7 is a block diagram showing a configuration example of a base station (eNB) according to a first illustrative embodiment of the present invention.

Configuration examples of the DeNB 10, the RN 11, and the MBMS service control unit 15 according to this illustrative embodiment are explained hereinafter. FIG. 7 is a block diagram showing a configuration example of the DeNB 10. In FIG. 7, a radio communication unit 101 is an analog front end. That is, the radio communication unit 101 receives an OFDM signal from a transmission data processing unit 602 that performs baseband signal processing of transmission data, and generates a downlink signal to be transmitted to the eNB-UE 13 or the RN 11 by performing a transmission process including D/A conversion, frequency conversion (up conversion), and amplification. Further, the radio communication unit 101 performs a reception process including amplification, frequency conversion (down conversion), and A/D conversion for an uplink signal transmitted from the eNB-UE 13 or the RN 11, and supplies the obtained baseband OFDM signal to a reception data processing unit 103.

A transmission data processing unit 102 performs digital baseband signal processing for transmission data. That is, the transmission data processing unit 102 acquires, from a communication unit 104, user data (including unicast data and MBMS data) to be transmitted to the eNB-UE 13 or the RN 11 and control data. The transmission data processing unit 102 maps these transmission data onto a transport channel (BCH (Broadcast Channel), DL-SCH (Downlink Shared Channel), PCH (Paging Channel), or MCH (Multicast Channel)), and generates a physical channel (PBCH (Physical Broadcast Channel), i (Physical Downlink Shared Channel), PDCCH (Physical Downlink Control Channel), or PMCH (Physical Multicast Channel)) by performing multiplexing of transport channels, error correction encoding, rate matching, interleaving, and so on. Further, the transmission data processing unit 102 generates a transmission symbol sequence for each physical channel by performing scrambling, modulation (symbol mapping), and so on. Further, the transmission data processing unit 102 generates a transmission baseband OFDM signal from the transmission symbol sequence by performing signal processing including layer mapping (when MIMO (Multiple Input/Multiple Output) is implemented), pre-coding (when MIMO is implemented), mapping onto resource elements, IDFT, and addition of guard intervals (Cyclic Prefix).

The reception data processing unit 103 performs digital baseband signal processing for restoring received data. That is, the reception data processing unit 103 restores user data and control data of the uplink transmitted from the eNB-UE 13, the RN-UE 12, or the RN 11 by performing signal processing including DFT, demodulation (symbol demapping), descramble, and channel decoding for a reception baseband SC-FDMA signal supplied from the radio communication unit 101. The obtained user data and part of the control data are transferred to a core network (not shown) through the communication unit 104.

A scheduling control unit 105 performs transmission scheduling of the downlink and the uplink between the RN 11 and the eNB-UE 13. Further, the scheduling control unit 105 performs transmission scheduling of an MBSFN signal into which MBMS data is encoded, based on MBMS scheduling information obtained from the MBMS service control unit 15.

Incidentally, as described above, a PMCH into which MBMS data is encoded is mapped onto resource elements within MBSFN subframes. In contrast to this, either ordinary sub frames or MBSFN subframes may be used for transmission of a physical channel addressed to an RN. Note that when the same frequency is used for the backhaul link and the access link, the RN 11 needs to secure a gap period during which transmission to the RN-UE 12 is stopped, and to receive from the DeNB 10 at this gap period. To facilitate securing the gap period, it has been known that the MBSFN subframes are used for transmission from the DeNB 10 to the RN 11. In MBSFN subframes except for the MBMS service period, the RN-UE 12 can recognize that it does not need to receive of a downlink signal from the RN 11.

Figure 8:
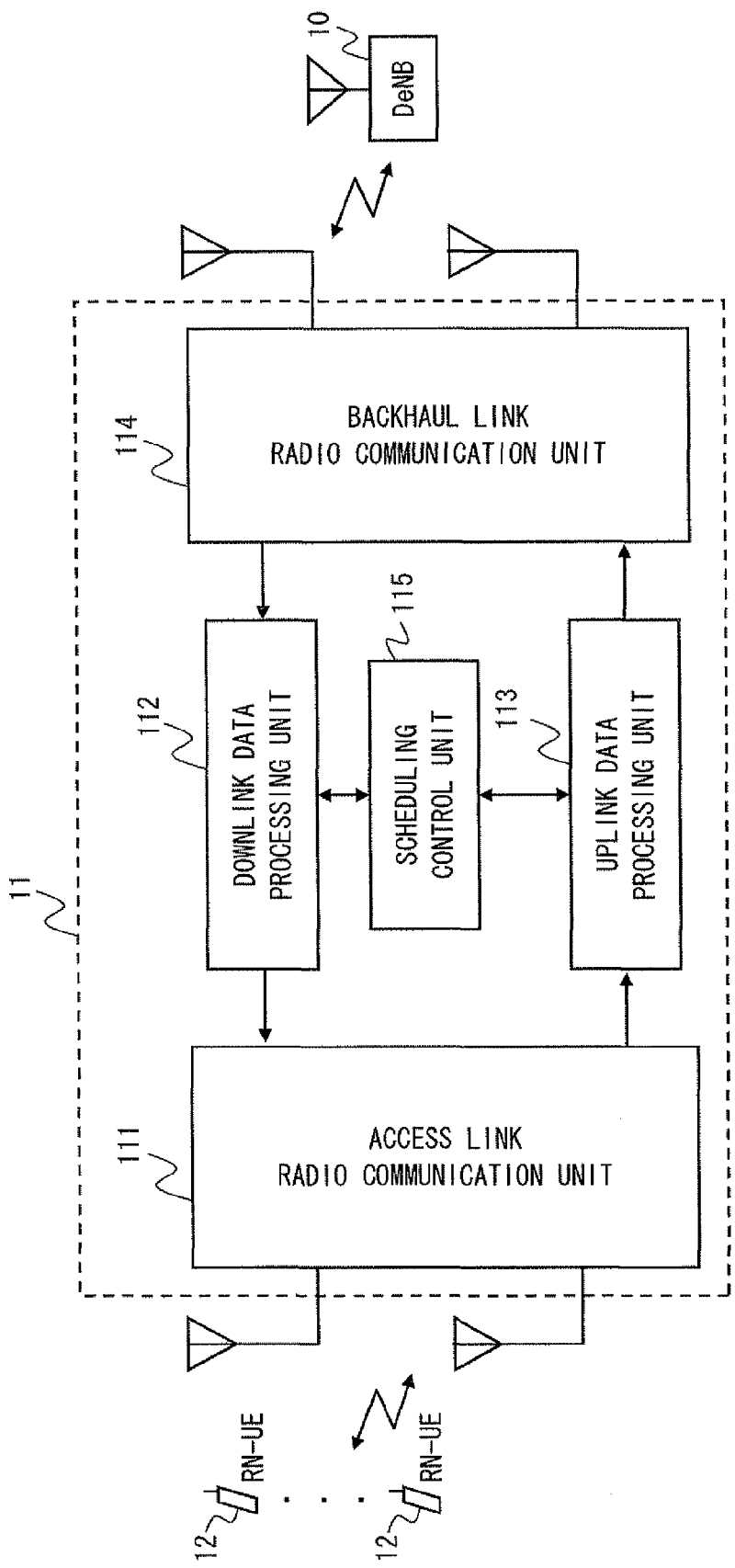
FIG. 8 is a block diagram showing a configuration example of a relay station (RN) according to a first illustrative embodiment of the present invention.

FIG. 8 is a block diagram showing a configuration example of the RN 11. In FIG. 8, an access link radio communication unit 111 has similar functions to those of the radio communication unit 101 of the DeNB 10. That is, the access link radio communication unit 111 transmits a downlink signal to the RN-UE 12 via an antenna and receives an uplink signal from the RN-UE 12 via an antenna. Meanwhile, a backhaul link radio communication unit 114 is an analog front end that transmits a uplink signal to and receives a downlink signal from the DeNB 10.

A downlink data processing unit 112 performs digital baseband signal processing to relay the downlink signal from the DeNB 10 to the RN-UE 12. That is, the downlink data processing unit 112 receives a baseband OFDM signal from the backhaul link radio communication unit 114. The downlink data processing unit 112 restores a bit sequence of a transport channel by performing signal processing such as DFT, demodulation, and channel decoding, and acquires transfer information from the DeNB 10 contained in the restored transport channel. Further, the downlink data processing unit 112 generates a baseband OFDM signal to be sent to the access link by mapping the acquired transfer information onto the transport channel that is used to transmit the acquired information to the RN-UE 12 and performing signal processing such as channel encoding, modulation, and IDFT. The generated baseband OFDM signal is supplied to the access link radio communication unit 111.

The uplink data processing unit 112 performs digital baseband signal processing to relay the uplink signal from the RN-UE 12 to the DeNB 10. That is, the uplink data processing unit 112 receives a baseband SC-FDMA signal from the access link radio communication unit 111. The uplink data processing unit 112 restores uplink channel data by performing signal processing such as DFT, demodulation, and channel decoding. Further, the uplink data processing unit 112 generates a baseband SC-FDMA signal to be sent to the backhaul link by mapping the acquired uplink channel data onto a transport channel that is used to transmit the acquired information to the DeNB 10 and performing signal processing such as channel encoding, modulation, and IDFT. The generated SC-FDMA signal is supplied to the backhaul link radio communication unit 114.

A scheduling control unit 115 performs transmission scheduling of the access link and the backhaul link. Further, the scheduling control unit 115 controls, based on MBMS scheduling information obtained from the MBMS service control unit 15, the radio communication units 111 and 114 to stop signal transmission using the same frequency as that of the MBSFN signal while the DeNB 10 transmits the MBSFN signal.

Figure 9:
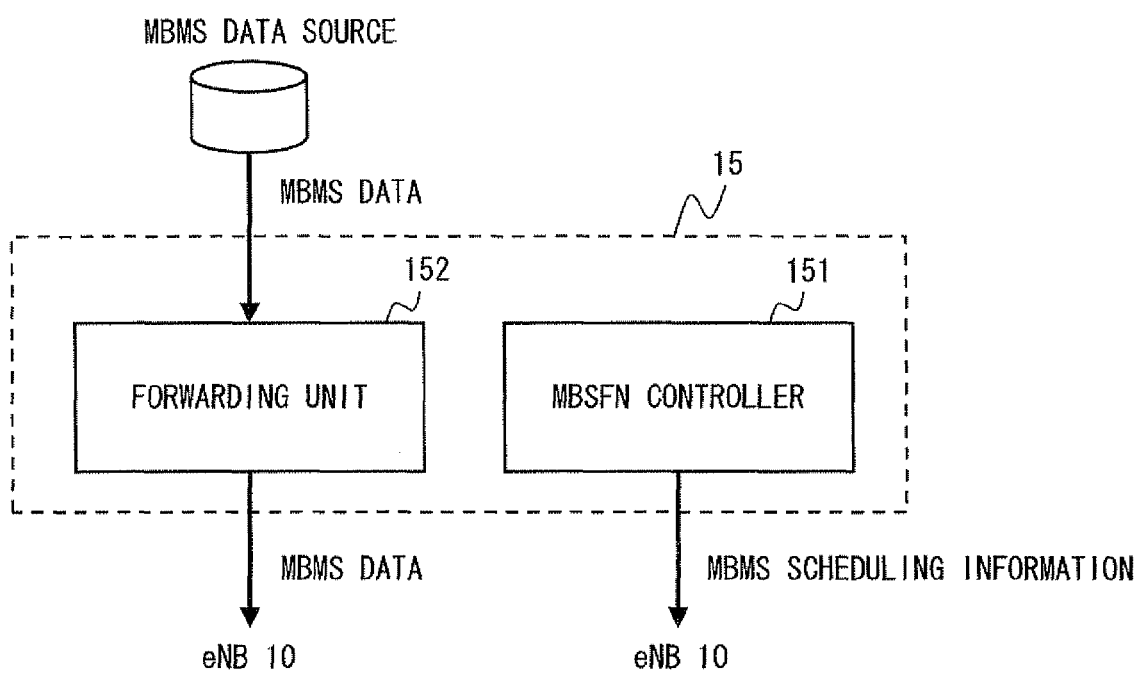
FIG. 9 is a block diagram showing a configuration example of a MBMS service control unit according to a first illustrative embodiment of the present invention.

FIG. 9 is a block diagram showing a configuration example of the MBMS service control unit 15. An MBSFN controller 151 has the functions of the above-described MCE. That is, the MBSFN controller 151 performs signaling relating to the MBSFN with base stations, including the DeNB 10, located in an MBSFN synchronization area. The MBSFN controller 151 transmits MBMS scheduling information to base stations, including the DeNB 10, located in an MBSFN synchronization area.

A forwarding unit 152 has the functions of the above-described MBMS GW. That is, the forwarding unit 152 acquires MBMS data from a MBMS data source and transmits the acquired MBMS data to base stations, including the DeNB 10, located in an MBSFN synchronization area.

Figure 10:
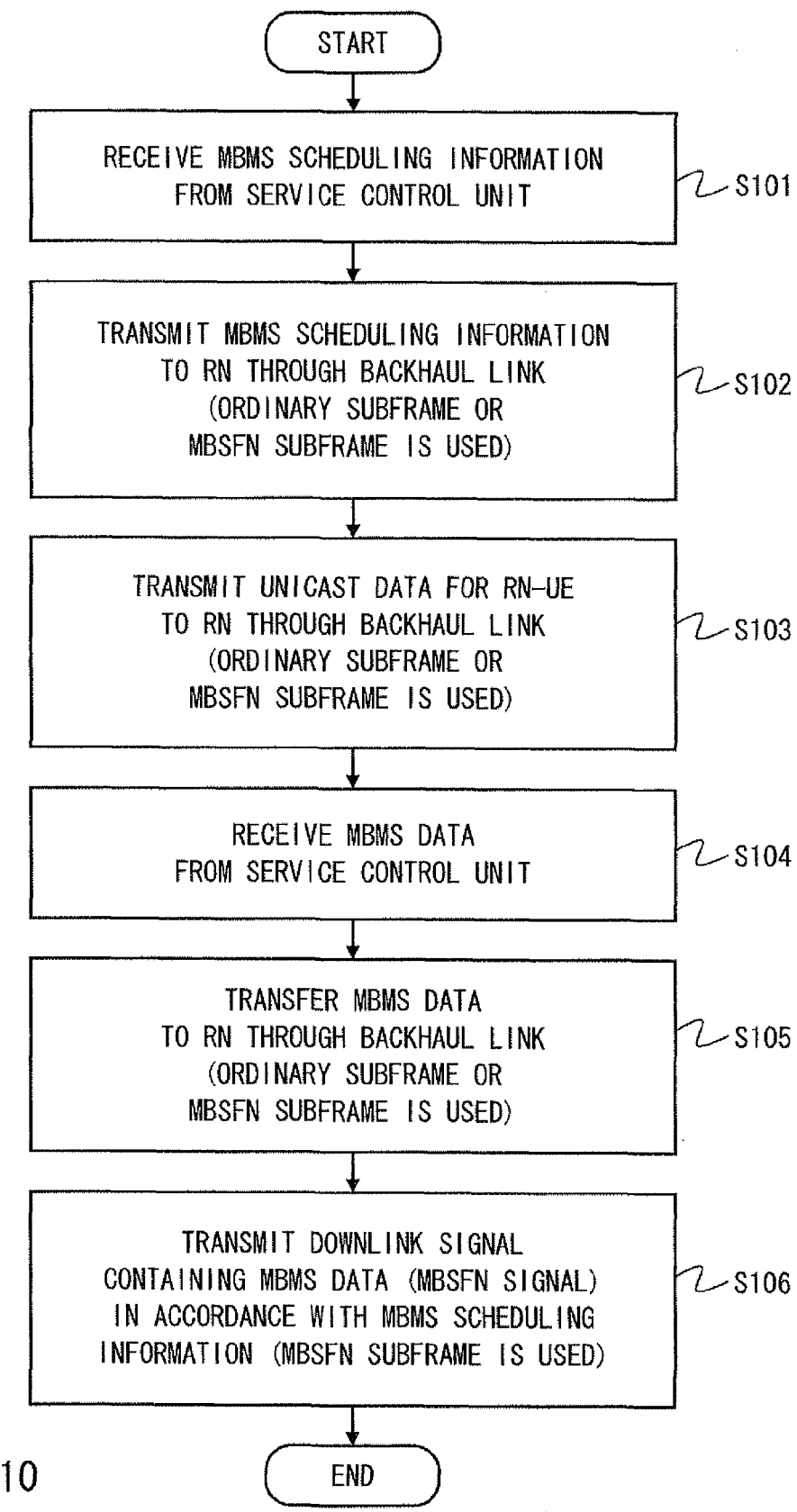
FIG. 10 is a flowchart showing a specific example of a downlink transmission operation performed by a base station (eNB) according to a first illustrative embodiment of the present invention.

Next, specific examples of a downlink transmission operation performed by the DeNB 10 and a relay operation performed by the RN 11 are explained hereinafter. FIG. 10 is a flowchart showing a specific example of a downlink transmission operation performed by the DeNB 10. In a step S101, the scheduling control unit 105 receives MBMS scheduling information from the MBMS service control unit 15 through the communication unit 104. In a step S102, the scheduling control unit 105 transmits the MBMS scheduling information to the RN 11 through the transmission data processing unit 102 and the radio communication unit 101 and through the backhaul link.

In a step S103, the transmission data processing unit 102 and the radio communication unit 101 transmit a radio signal into which unicast data for the RN-UE 12 is encoded, through the backhaul link in accordance with scheduling made by the scheduling control unit 105.

In a step S104, the communication unit 104 receives MBMS data from the MBMS service control unit 15. In a step S105, the transmission data processing unit 102 and the radio communication unit 101 transfer an MBMS-data-encoded radio signal, in accordance with the scheduling made by the scheduling control unit 105.

In a step S106, the transmission data processing unit 102 and the radio communication unit 101 transmit an MBMS-data-encoded downlink signal (MBSFN signal). This transmission is performed at a transmission timing synchronized with that of a neighbor base station in accordance with the scheduling that is made by the scheduling control unit 105 based on the MBMS scheduling information.

Note that the transmission of unicast data to the backhaul link (step S103) in FIG. 10 is irrelevant to the other transmission processes (transmission of MBMS scheduling information and transmission of MBMS data). That is, the step S103 may be performed at any given timing, provided that the use of resource elements is not overlapped for those transmissions.

Figure 11:
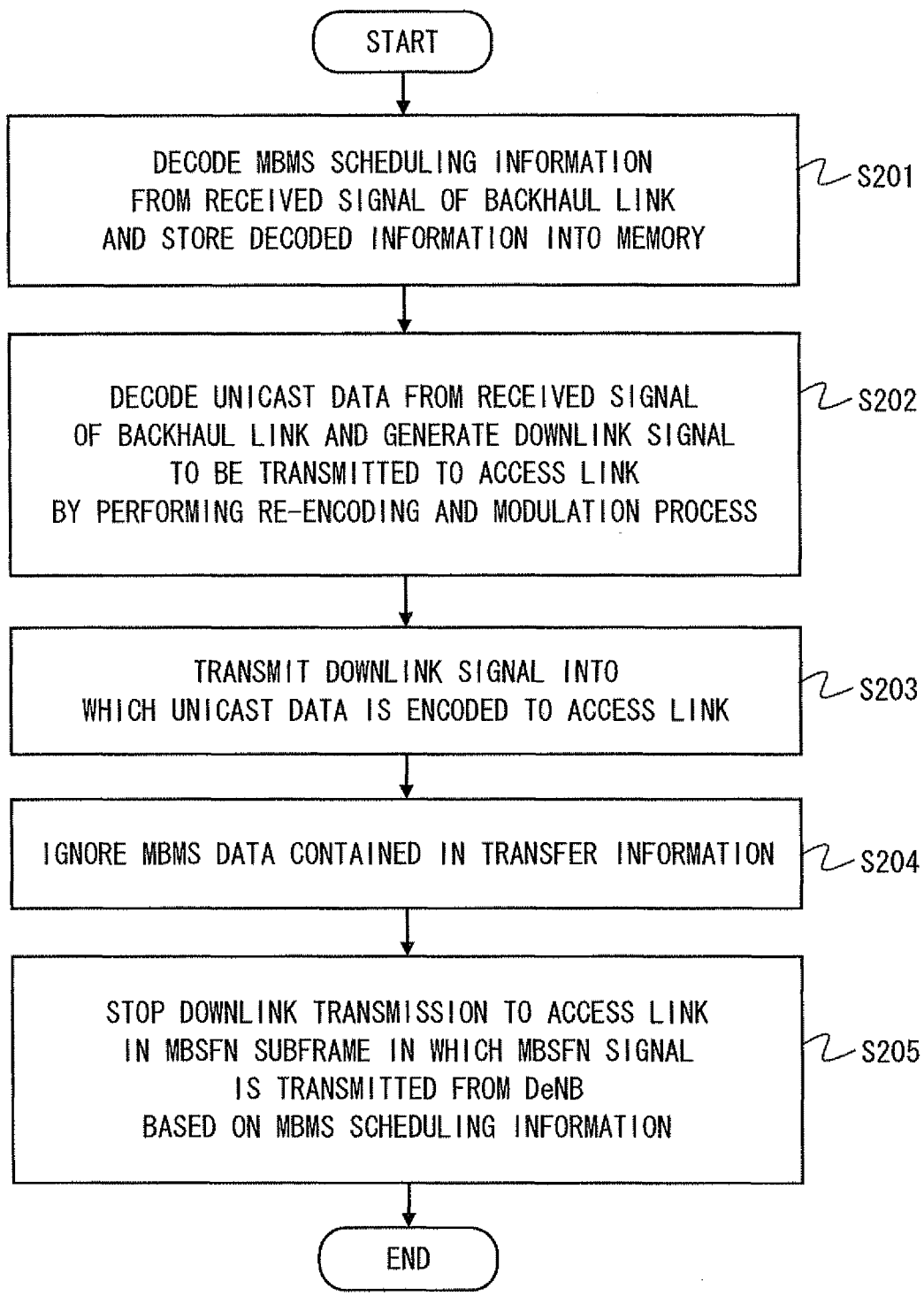
FIG. 11 is a flowchart showing a specific example of a relay operation performed by a relay station (RN) according to a first illustrative embodiment of the present invention.

FIG. 11 is a flowchart showing a specific example of a relay operation performed by the RN 11. In a step S201, the downlink data processing unit 112 decodes MBMS scheduling information from the received signal of the backhaul link and stores the decoded information into a memory (not shown). That is, the downlink data processing unit 112 restores a transport channel by performing demodulation and channel decoding for the received signal, and acquires MBMS scheduling information, as transfer information, from the restored transport channel.

In a step S202, the downlink data processing unit 112 decodes unicast data, as transfer information, from the received signal of the backhaul link. Further, the downlink data processing unit 112 generates a downlink signal into which the unicast data is encoded by performing re-encoding and a modulation process for the unicast data. That is, the downlink data processing unit 112 generates a downlink signal (baseband OFDM signal) to be transmitted to the access link, by mapping the unicast data onto a transport channel (such as DL-SCH) and performing channel encoding and a modulation process for the bit sequence of the transport channel. In a step S203, the access link radio communication unit 111 transmits, to the access link, the downlink signal into which the unicast data addressed to the RN-UE 12 is encoded.

In a step S204, the scheduling control unit 115 and the downlink data processing unit 112 ignore the MBMS data contained in the transfer information. Specifically, the downlink data processing unit 112 may omit decoding the transport channel (MCH) containing the MBMS data transferred from the DeNB 10 through the backhaul link. This is because the RN 11 according to this illustrative embodiment does not transfer the MBMS data to the RN-UE 12.

In a step S205, the scheduling control unit 115 controls the downlink data processing unit 112 and the access link radio communication unit 111 based on MBMS scheduling information to stop the downlink transmission to the access link in the MBSFN subframe on which an MBSFN signal is transmitted from the DeNB 10.

Note that the transmission stop of the downlink signal in the step S205 may be carried out for the frequency band used by the DeNB 10 for the MBSFN transmission. When the frequency band used by the RN 11 for the downlink transmission is different from the frequency band of the MBSFN transmission by the DeNB 10, for example, when the RN 11 performs frequency conversion in the relaying operation, the RN 11 does not need to stop the downlink signal transmission.

As described above, the RN 11 according to this illustrative embodiment is configured in such a manner that when transfer information encoded into a radio signal to be transmitted from the DeNB 10 through the backhaul link is multicast information (i.e., MBMS data), the RN 11 does not transmit the radio signal (MBMS signal) into which the multicast information is encoded to the RN-UE 12. Specifically, the RN 11 may omit decoding the transport channel (MCH) containing the MBMS data transferred from the DeNB 10 through the backhaul link. That is, the RN 11 according to this illustrative embodiment does not perform MBSFN transmission. In this way, it is possible to prevent the MBSFN signal that is delayed from the transmission timing defined by the MBMS scheduling information from being transmitted from the RN 11.

Further, as shown as a specific example of an operation of the RN 11 in FIG. 11, the RN 11 stops the downlink transmission to the access link in the MBSFN subframe on which an MBSFN signal is transmitted from the DeNB 10. As a result, it is possible to reduce the interference to the RN-UE 12 and the eNB-UE 13, which receive the MBSFN signal.

Second Illustrative Embodiment

In the above-described first illustrative embodiment, an example where the RN 11 stops downlink signal transmission when the DeNB 10 performs MBSFN transmission is shown. In this illustrative embodiment, an example where the RN 11 amplifies and relays an MBSFN signal with a small delay by switching from a Layer 2 or Layer 3 Relay operation to a Layer 1 Repeater operation when the DeNB 10 performs MBSFN transmission is shown.

Figure 12:
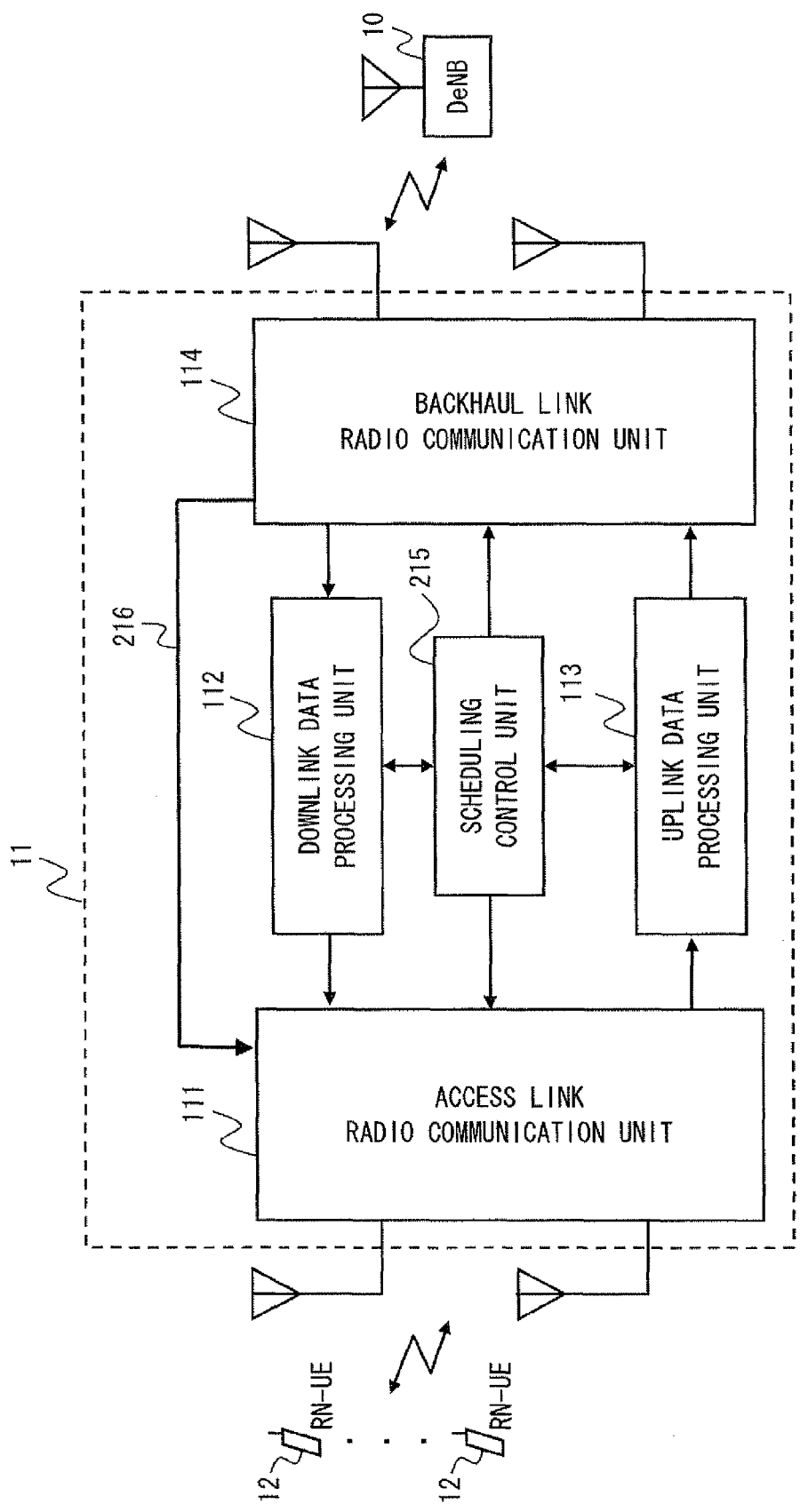
FIG. 12 is a block diagram showing a configuration example of a relay station (RN) according to a second illustrative embodiment of the present invention.

The configuration of a mobile communication system according to this illustrative embodiment may be similar to that of the first illustrative embodiment shown in FIG. 6. FIG. 12 is a block diagram showing a configuration example of an RN 11 that performs switching between a Layer 2 or Layer 3 Relay operation and a Layer 1 Repeater operation. In the configuration shown in FIG. 12, a bypass signal line 216 that bypasses the downlink data processing unit 112 is provided between the backhaul link radio communication unit 114 and the access link radio communication unit 111.

A scheduling control unit 215 switches the operation mode to a Layer 1 Repeater operation based on MBMS scheduling information when the DeNB 10 transmits an MBSFN signal. Specifically, the scheduling control unit 215 switches the signal path so that a reception signal received by the backhaul link radio communication unit 114 is supplied to the access link radio communication unit 111 via the bypass signal line 216 (while bypassing the downlink data processing unit 112). Note that only the downlink signal needs to be amplified and re-transmitted through the Layer 1 Repeater operation and the uplink signal does not need to be amplified and re-transmitted through the Layer 1 Repeater operation.

Figure 13:
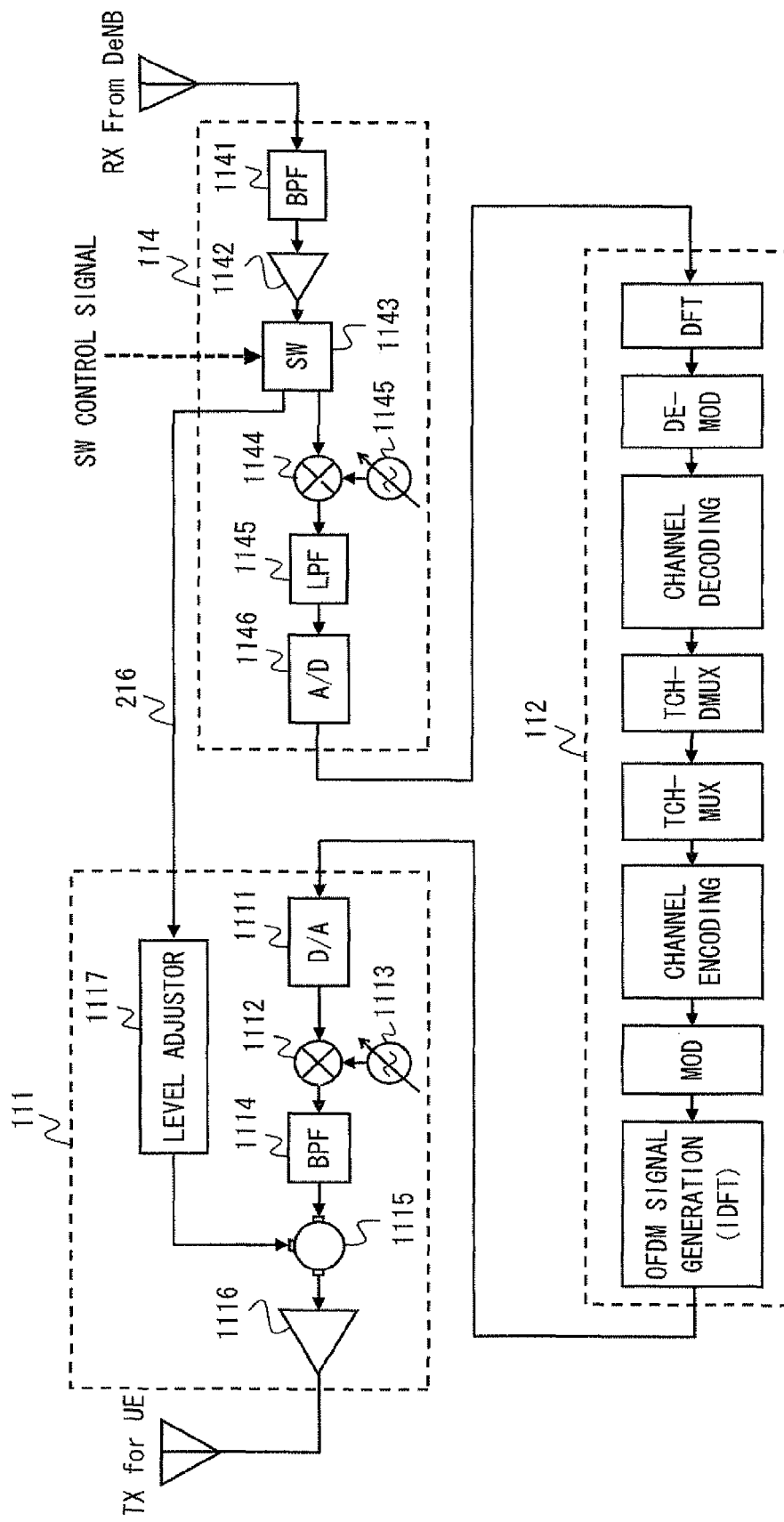
FIG. 13 is a block diagram showing a configuration example of the main part of the block diagram shown in FIG. 12.

FIG. 13 shows a configuration example of the backhaul link radio communication unit 114 and the access link radio communication unit 111 capable of switching the downlink signal relay operation. In the example shown in FIG. 13, a downlink signal of the backhaul link received via an antenna is supplied to a RF (Radio Frequency) switch 1143 through a band-pass filter 1141 for band selection and a low-noise amplifier 1142. The RF switch 1143 operates in response to an SW control signal supplied from the scheduling control unit 215, and switches the destination of an input RF signal (downlink signal) between a mixer 1144 and the bypass signal line 216. When an ordinary Layer 2 or Layer 3 Relay operation including decoding and re-encoding is to be performed, the scheduling control unit 215 may control the RF switch 1143 to select the mixer 1144. On the other hand, when a Layer 1 Relay operation for an MBSFN signal is to be performed, the scheduling control unit 215 may control the RF switch 1143 to select the bypass signal line 216.

The mixer 1144 down-converts an RF signal (downlink signal) into a baseband frequency band by multiplying the RF signal by a local signal generated by a frequency synthesizer 1145. The reception signal, which is down-converted by the mixer 1144, is supplied to an A/D converter 1146 through a low-pass filter 1145.

The downlink data processing unit 112, which performs a digital baseband process, performs signal processing including DFT, demodulation (symbol demapping), and channel decoding, de-multiplexing of transport channels (TCHs) by using a reception signal data sequence sampled by the A/D converter 1146. In this way, the downlink data processing unit 112 restores transfer information from the DeNB 10. Further, the downlink data processing unit 112 generates a downlink signal data sequence (baseband OFDM signal) to be transmitted to the access link by performing signal processing including TCH multiplexing, channel encoding, modulation (symbol mapping), and IDFT for the transfer information. The downlink signal data sequence is supplied to the access link radio communication unit 111.

A D/A converter 1111, a mixer 1112, a frequency synthesizer 1113, and a band-pass filter 1114 included in the access link radio communication unit 111 shown in FIG. 13 are used when a Layer 2 or Layer 3 Relay operation is performed. That is, the D/A converter 1111 converts a downlink signal data sequence (baseband OFDM signal) into an analog signal and supplied the obtained analog signal to the mixer 1112. The mixer 1112 multiplexes the analog baseband OFDM signal by a local signal generated by the frequency synthesizer 1113 to generate a transmission signal of an RF band. The RF band transmission signal generated by the mixer 1112 is supplied to a directional coupler 1115 through the band-pass filter (BPF) 1114. The directional coupler 1115 combines a signal supplied from the BPF 1114 with a signal supplied from a level adjustor 1117 (which is described later) and supplies the combined signal to a transmission power amplifier 1116. The transmission power amplifier 1116 amplifies the transmission signal and outputs the amplified signal to an antenna.

The level adjustor 1117 included in the access link radio communication unit 111 shown in FIG. 13 adjusts the signal level of an RF band reception signal that is supplied from the RF switch 1143 through the bypass signal line 216 to conform to the input dynamic range of the transmission power amplifier 1116. For example, a variable attenuator or a variable gain amplifier may be used for the level adjustor 1117.

Note that the circuit configuration in FIG. 13 shows merely a conceptual and representative example. For example, the positions of the amplifier and the filter in FIG. 13 may be changed as appropriate. Further, the circuit configuration in FIG. 13 is a direct conversion type, but it may be a heterodyne type.

Figure 14:
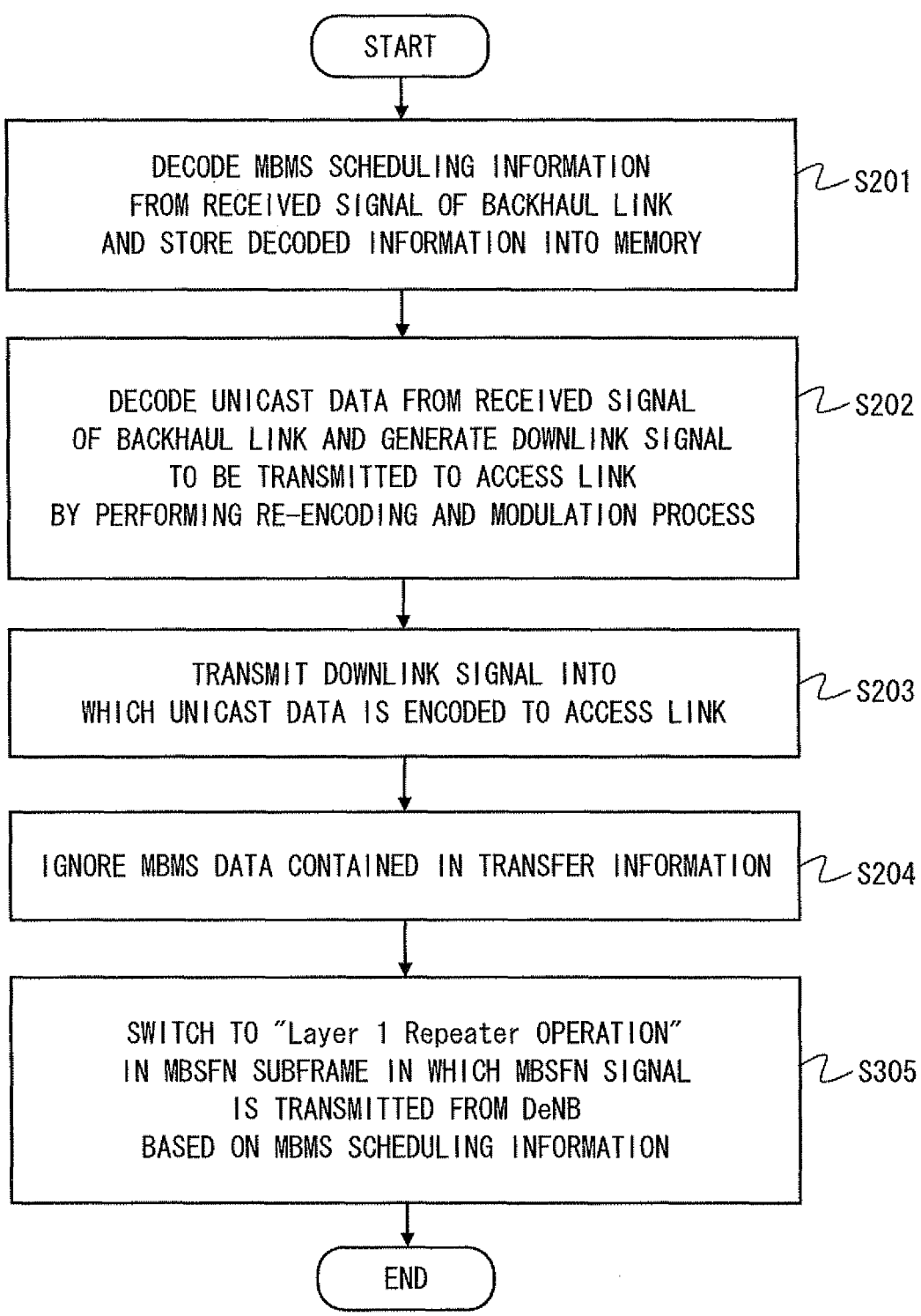
FIG. 14 is a flowchart showing a specific example of a relay operation performed by a relay station (RN) according to a second illustrative embodiment of the present invention.

FIG. 14 is a flowchart showing a specific example of a relay operation procedure of the RN 11 according to this illustrative embodiment. Among the steps shown in FIG. 14, the steps S201 to S204 may be similar to corresponding steps shown in FIG. 11. In a step S305 in FIG. 14, the scheduling control unit 115 controls the radio communication units 111 and 114, based on MBMS scheduling information, to perform a Layer 1 Repeater operation in the MBSFN subframe on which an MBSFN signal is transmitted from the DeNB 10. In this step, the scheduling control unit 115 controls the downlink data processing unit 112 to stop transmission of a relay signal generated through decoding and re-encoding processes.

Similarly to the first illustrative embodiment, the RN 11 according to this illustrative embodiment ignores transfer information encoded into a radio signal to be transmitted from the DeNB 10 through the backhaul link when the transfer information is multicast information (i.e., MBMS data). Specifically, the RN 11 may omit decoding the transport channel (MCH) containing the MBMS data transferred from the DeNB 10 through the backhaul link. In this way, the RN 11 does not transmit the MBMS-data-encoded downlink signal which is generated through decoding and re-encoding processes performed within the RN 11. Therefore, it is possible to prevent the MBSFN signal that is delayed from the transmission timing defined by the MBMS scheduling information from being transmitted from the RN 11.

Further, the RN 11 according to this illustrative embodiment switches to a Layer 1 Repeater operation while an MBSFN signal is transmitted from the DeNB 10. That is, the RN 11 amplifies and re-transmits the MBSFN signal received from the DeNB 10 without performing decoding and re-encoding while the MBSFN signal is transmitted from the DeNB 10. In this way, the delay that would be otherwise caused by the decoding and re-encoding is prevented and the MBSFN signal is thereby re-transmitted with a small delay. Therefore, it is possible to reduce the increase in the multipath delay. Further, in comparison to the cases where the downlink transmission is stopped as in the case of the first illustrative embodiment, it is possible to expand the MBSFN service area.

Third Illustrative Embodiment

In this illustrative embodiment, the DeNB 10 prevents the transfer of MBMS data to the RN 11 through the backhaul link. In this way, in addition to the capability of preventing an MBSFN signal that is delayed due to decoding and re-encoding performed in the RN 11 from being transmitted, it is expected that the use efficiency of the radio resources of the backhaul link will improve.

Figure 15:
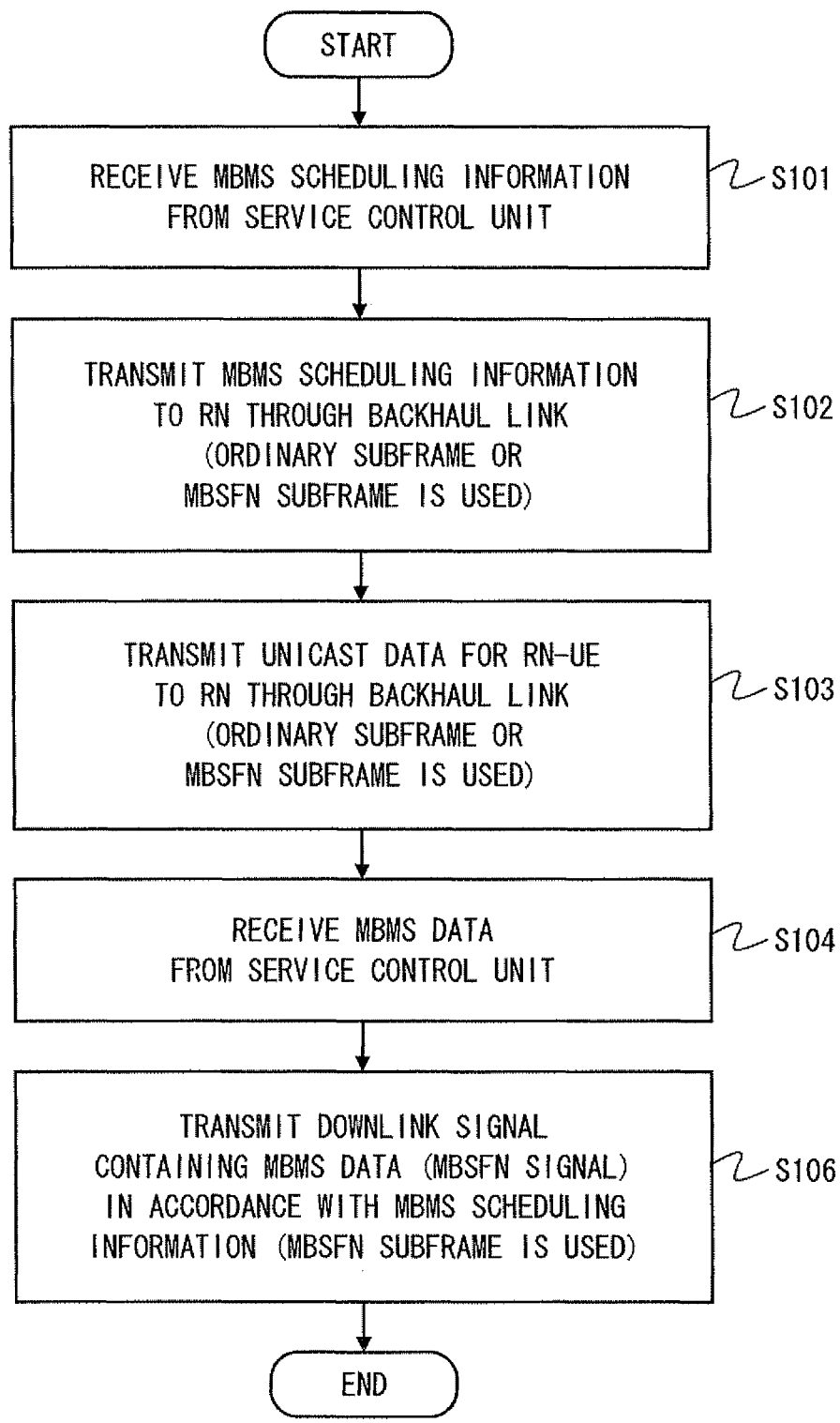
FIG. 15 is a flowchart showing a specific example of a downlink transmission operation performed by a base station (eNB) according to a third illustrative embodiment of the present invention.

The configuration of a mobile communication system according to this illustrative embodiment and the configuration of each apparatus may be similar to those of the first illustrative embodiment. FIG. 15 is a flowchart showing a specific example of a downlink transmission operation of the DeNB 10 according to this illustrative embodiment. FIG. 15 is similar to FIG. 10 explained in the first illustrative embodiment except that FIG. 15 does not include the step S105. That is, the DeNB 10 according to this illustrative embodiment does not transfer MBMS data to the RN 11 even if the DeNB 10 receives the MBMS data from the MBMS service control unit 15.

Figure 16:
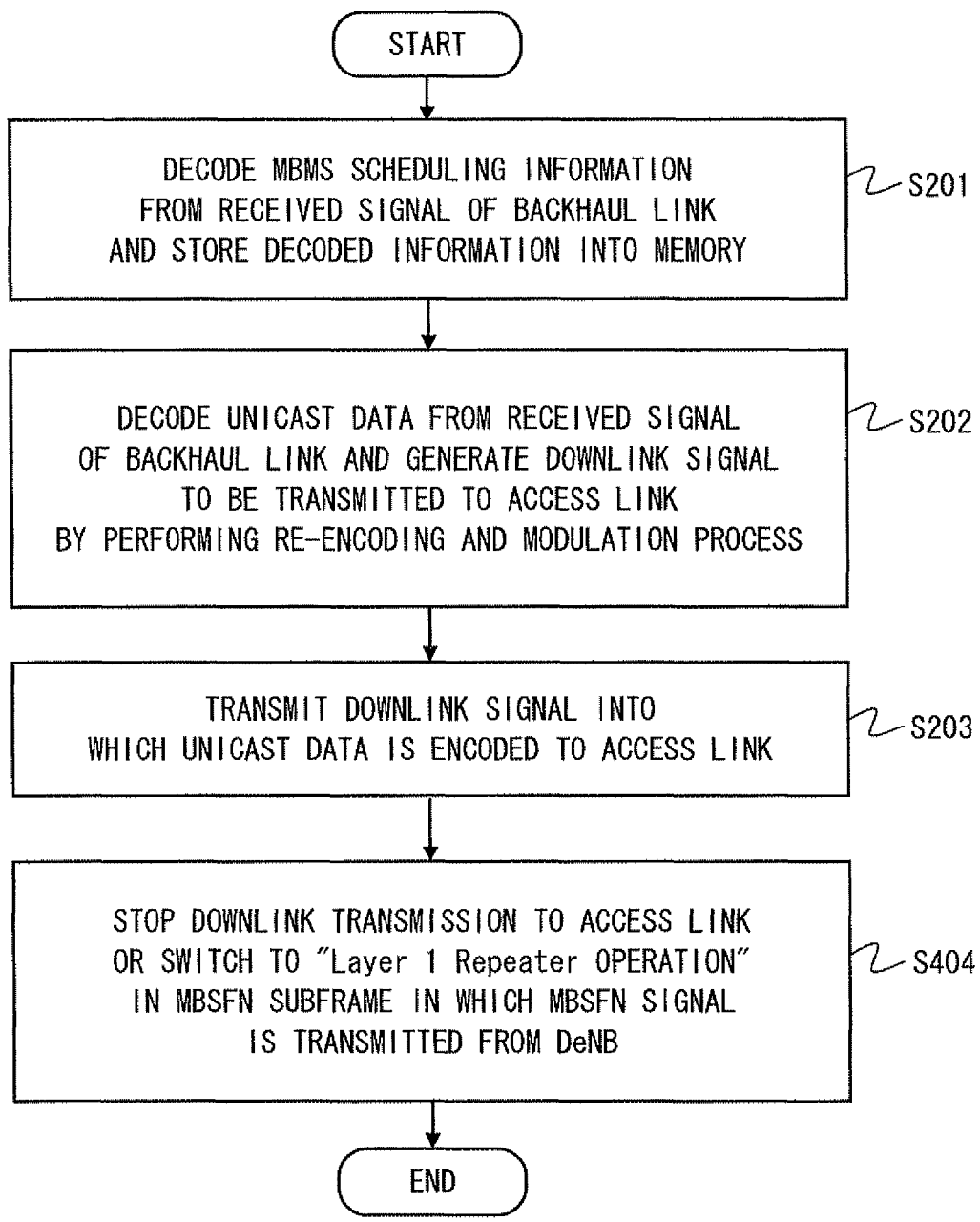
FIG. 16 is a flowchart showing a specific example of a relay operation performed by a relay station (RN) according to a third illustrative embodiment of the present invention.

FIG. 16 is a flowchart showing a specific example of a relay operation of the RN 11 according to this illustrative embodiment. Among the steps shown in FIG. 16, the steps S201 to S203 may be similar to corresponding steps shown in FIG. 11. Note that since no MBMS data is included in the transfer information from the DeNB 10, the step relating to the MBMS data (step S204) is unnecessary.

In a step S404 in FIG. 16, the RN 11 stops the downlink transmission to the access link as in the case of the first illustrative embodiment or switches to a Layer 1 Repeater operation as in the case of the second illustrative embodiment in the MBSFN subframe on which an MBSFN signal is transmitted from the DeNB 10.

Fourth Illustrative Embodiment

In this illustrative embodiment, the RN 11 determines whether or not the RN 11 can transmit MBMS data transferred from the DeNB 10 through the backhaul link in accordance with a predetermined schedule. When it is determined that the transmission is possible, the RN 11 transmits an MBSFN signal generated by decoding and re-encoding performed by the downlink data processing unit 112 in accordance with the MBMS transmission schedule. On the other hand, when it is determined that the transmission is impossible, the RN 11 does not transmit the MBSFN signal into which MBMS data transferred through the backhaul link is re-encoded. Note that when the MBSFN signal into which MBMS data is re-encoded is not transmitted, the RN 11 may stop the downlink transmission to the access link as in the case of the first illustrative embodiment or switch to a Layer 1 Repeater operation as in the case of the second illustrative embodiment in the MBSFN subframe on which an MBSFN signal is transmitted from the DeNB 10.

Figure 17:
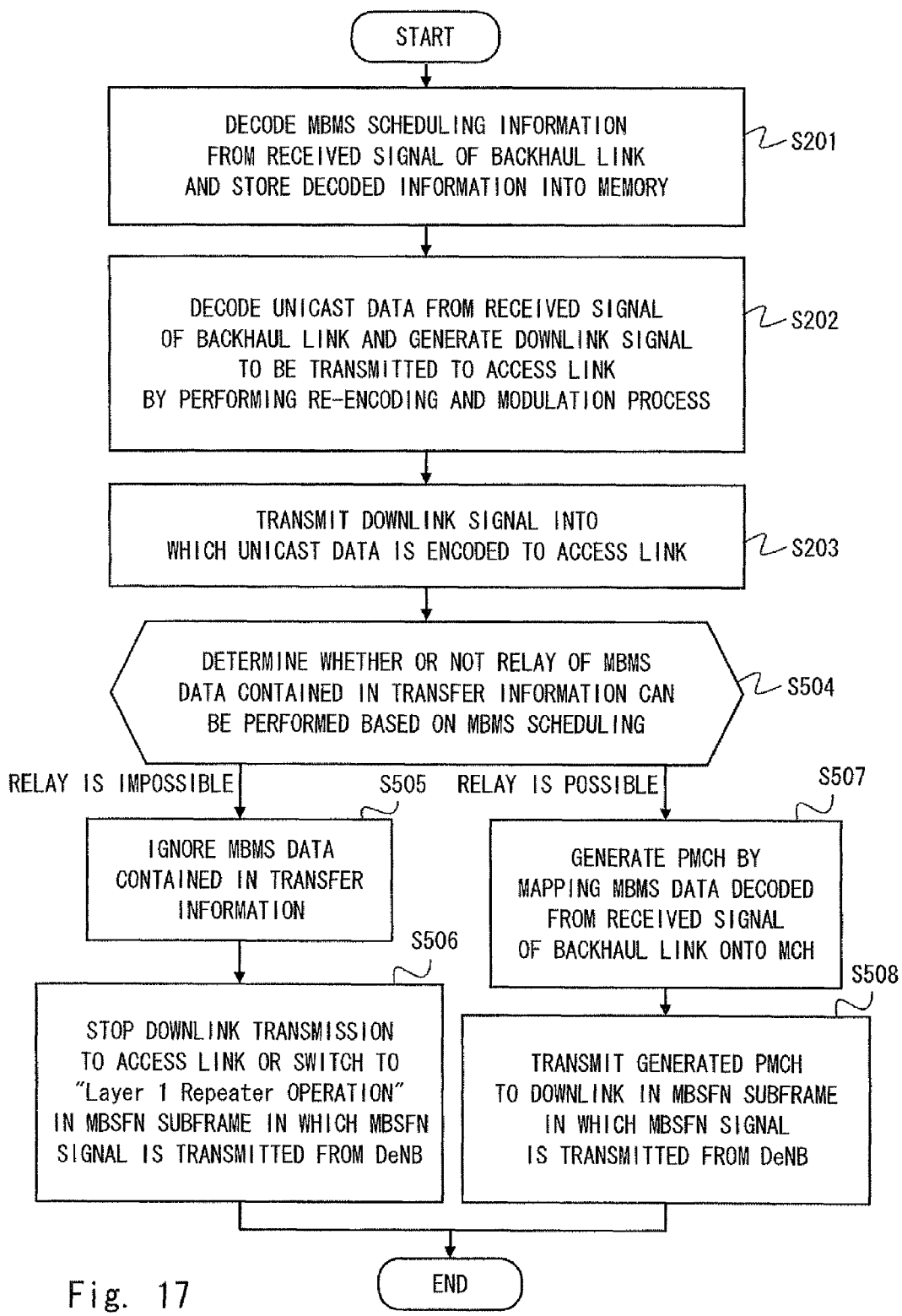
FIG. 17 is a flowchart showing a specific example of a relay operation performed by a relay station (RN) according to a fourth illustrative embodiment of the present invention.

The configuration of a mobile communication system according to this illustrative embodiment and the configuration of each apparatus may be similar to those of the first illustrative embodiment. FIG. 17 is a flowchart showing a specific example of a relay operation of the RN 11 according to this illustrative embodiment. Among the steps shown in FIG. 17, the steps S201 to S203 may be similar to corresponding steps shown in FIG. 11.

In a step S504 in FIG. 17, the RN 11 (scheduling control unit 115 or 215) determines whether or not MBMS data contained in the transfer information can be relayed based on the MBMS scheduling information. The RN 11 may determine whether or not the RN 11 can complete the signal processing including MBMS data mapping onto an MCH, channel encoding, modulation (symbol mapping), and OFDM signal generation (IFDT) before the transmission time determined by the MBMS scheduling information. Specifically, the RN 11 may compare a margin time (T) with the internal processing time (T1) required for the above-described signal processing, and determine that the relay is possible when T is equal to or greater than T1. On the other hand, when T is smaller than T1, the RN 11 may determine that the relay is impossible. The internal processing time T1 may be stored in advance in a nonvolatile memory in the RN 11, or may be calculated in the scheduling control unit 115 (215) by statistical processing based on the processing records in the past.

When it is determined that "relay is impossible" in the step S504, the RN 11 ignores the MBMS data contained in the transfer information and does not transmit the MBSFN signal that is generated through decoding and re-encoding (step S505). In a step S506, the RN 11 stops the downlink transmission to the access link as in the case of the first illustrative embodiment or switches to a Layer 1 Repeater operation as in the case of the second illustrative embodiment in the MBSFN subframe on which an MBSFN signal is transmitted from the DeNB 10.

When it is determined that "relay is possible" in the step S504, the downlink data transmission unit 112 maps MBMS data decoded from the received signal of the backhaul link onto an MCH and generates a PMCH (step S507). Further, the downlink data transmission unit 112 generates an OFDM signal through layer mapping, resource element mapping, and OFDM signal generation (IDFT).

In a step S508, the access link radio communication unit 111 transmits, to the downlink, an RF-band OFDM signal (MBSFN signal) including the PMCH generated through decoding and re-encoding in the MBSFN subframe on which an MBSFN signal is transmitted from the DeNB 10.

In this illustrative embodiment, the RN 11 determines whether or not the RN 11 can complete signal processing including decoding and re-encoding and thereby perform MBSFN transmission before the transmission timing defined by the MBMS scheduling information. When the MBSFN transmission cannot be performed before the transmission timing, the MBSFN signal generated through decoding and re-encoding is not transmitted. Therefore, it is possible to prevent the MBSFN signal that is delayed from the transmission timing from being transmitted from the RN 11.

Fifth Illustrative Embodiment

In the above-described fourth illustrative embodiment, an example where the RN 11 determines whether or not the RN 11 can performs MBSFN transmission before the transmission timing defined by the MBMS scheduling information is shown. In this illustrative embodiment, an example where the DeNB 10 takes the delay time required for the signal processing performed by the RN 11 into account, and thereby transfers MBMS data to the RN 11 with a sufficient margin time before the transmission timing is explained.

Figure 18:
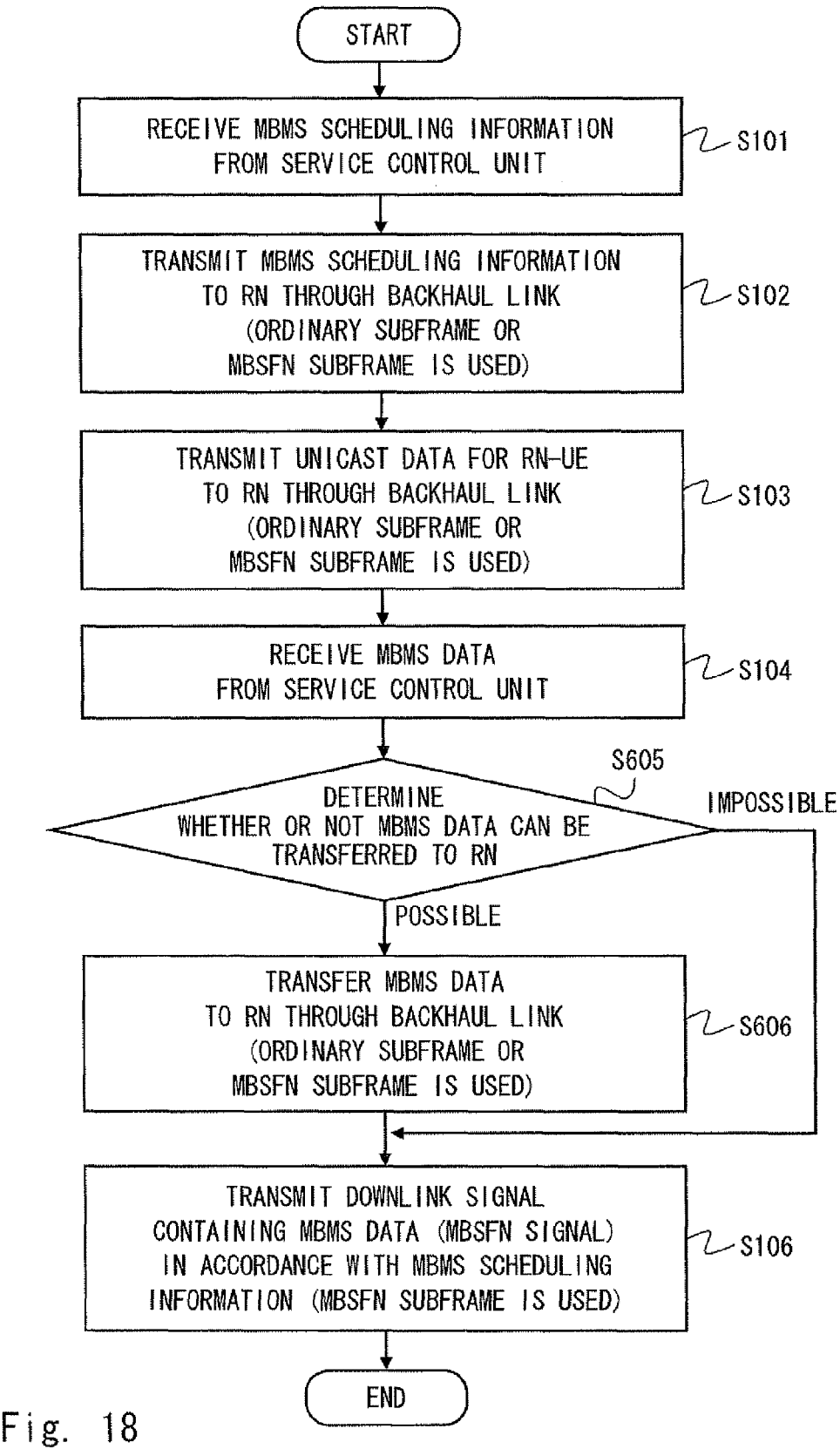
FIG. 18 is a flowchart showing a specific example of a downlink transmission operation performed by a base station (eNB) according to a fifth illustrative embodiment of the present invention.

The configuration of a mobile communication system according to this illustrative embodiment and the configuration of each apparatus may be similar to those of the first illustrative embodiment. FIG. 18 is a flowchart showing a specific example of a downlink transmission operation of the DeNB 10 according to this illustrative embodiment. Among the steps shown in FIG. 18, the steps S101 to S104 and S106 may be similar to corresponding steps shown in FIG. 10.

In a step S605, the DeNB 10 (scheduling control unit 105) determines whether MBMS data transfer to the RN 11 is possible or not. For the decision whether the transfer is possible or not, a margin time (T) from the time at which the MBMS data is acquired from the MBMS service control unit 15, the scheduled time of the MBMS data transfer to the RN 11, or the current time, to the transmission time determined by the schedule may be calculated, and this margin time (T) may be compared with an internal processing time (T1) required for the transfer process performed in the RN 11. When T is equal to or greater than T1, the DeNB 10 may determine that the relay is possible. On the other hand, when T is smaller than T, the RN 11 may determine that the relay is impossible. The DeNB 10 may receive the internal processing time T1 of the RN 11 from the RN 11. Alternatively, an operator may set the internal processing time T1 of the RN 11 in the DeNB 10.

Under the condition that the transfer is determined to be possible in the step S605, the DeNB 10 transfers the MBMS data to the RN 11 through the backhaul link (step S606).

Figure 19:
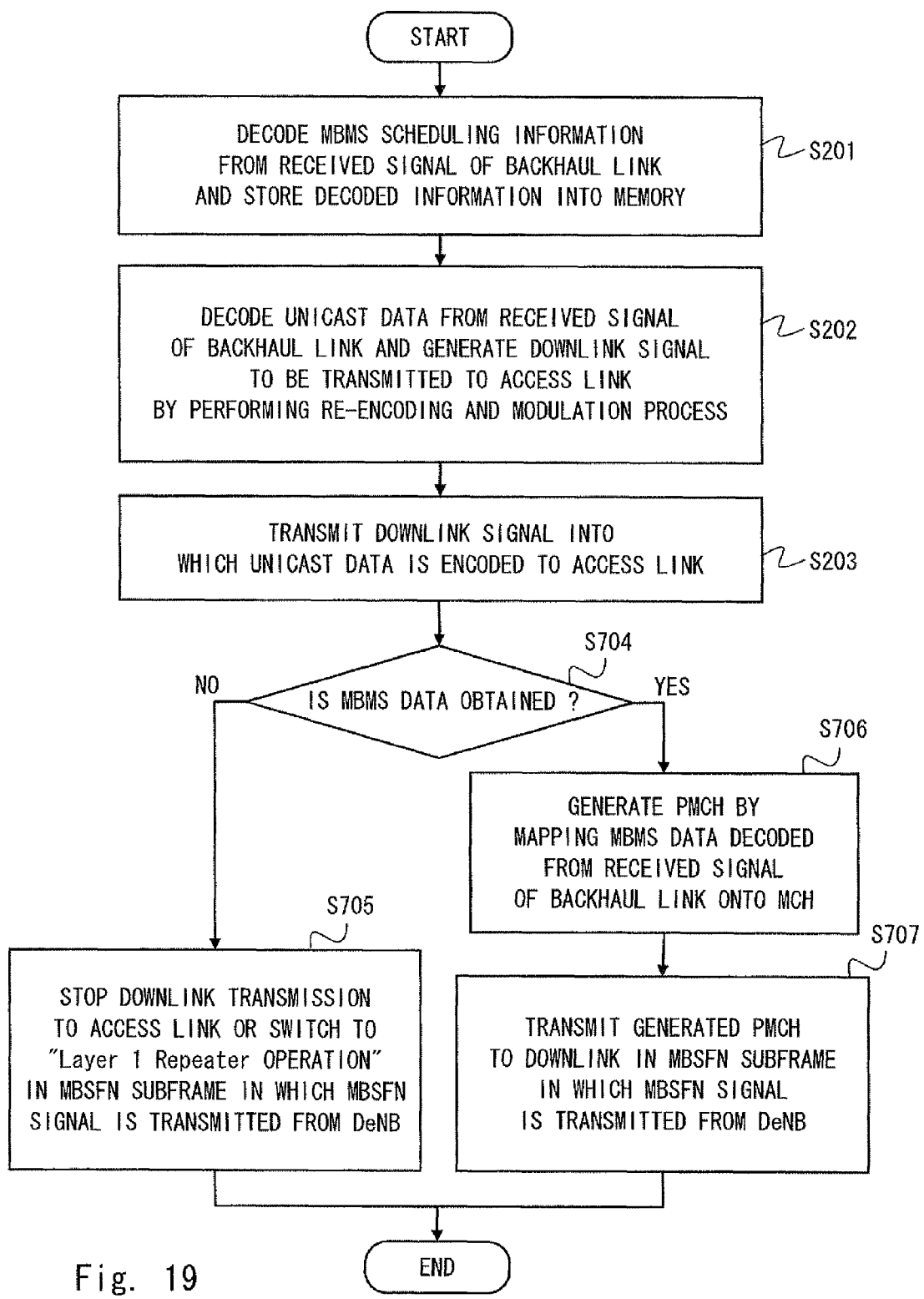
FIG. 19 is a flowchart showing a specific example of a relay operation performed by a relay station (RN) according to a third illustrative embodiment of the present invention.

FIG. 19 is a flowchart showing a specific example of a relay operation of the RN 11 according to this illustrative embodiment. Among the steps shown in FIG. 19, the steps S201 to S203 may be similar to corresponding steps shown in FIG. 11.

When no MBMS data is contained in the transfer information from the DeNB 10 (No at step S704), the RN 11 stops the downlink transmission to the access link as in the case of the first illustrative embodiment or switches to a Layer 1 Repeater operation as in the case of the second illustrative embodiment in the MBSFN subframe on which an MBSFN signal is transmitted from the DeNB 10.

When MBMS data is contained in the transfer information from the DeNB 10 (Yes at step S704), the RN 11 (downlink data transmission unit 112) maps the MBMS data decoded from the received signal of the backhaul link onto an MCH and generates a PMCH (step S706). Further, the downlink data transmission unit 112 generates an OFDM signal through layer mapping, resource element mapping, and OFDM signal generation (IDFT).

In a step S707, the RN 11 (access link radio communication unit 111) transmits an RF-band OFDM signal (MBSFN signal) including the PMCH generated through decoding and re-encoding to the downlink in the MBSFN subframe on which an MBSFN signal is transmitted from the DeNB 10.

As described above, in this illustrative embodiment, the DeNB 10 takes the delay time required for the signal processing performed by the RN 11 into account, and thereby transfers the MBMS data to the RN 11 with a sufficient margin time before the transmission timing. In this way, even when the internal processing delay occurs in the RN 11, the RN 11 can transmit the MBSFN signal in accordance with the predetermined transmission schedule. Therefore, it is possible to prevent any MBSFN signal that is delayed from the transmission timing defined by the MBMS scheduling information from being transmitted from the RN 11.

Figure 20:
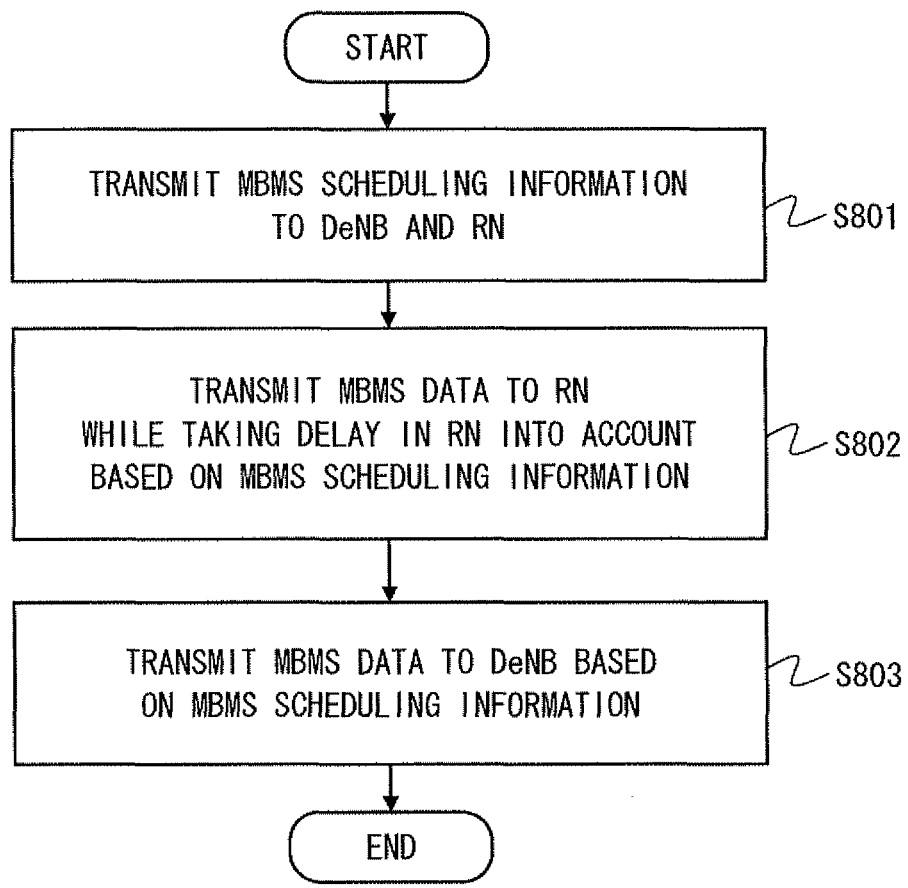
FIG. 20 is a flowchart showing a specific example of an MBMS data transmission operation performed by an MBMS service control unit according to a fifth illustrative embodiment of the present invention.

Note that the MBMS data transmission process in which the delay time required for the signal processing performed by the RN 11 is taken into account may be performed by the MBMS service control unit 15 instead of or in cooperation with the DeNB 10. FIG. 20 is a flowchart showing a specific example of an MBMS data transmission operation performed by the MBMS service control unit 15. In a step S801, the MBMS data control unit 15 (MBSFN controller 151) transmits MBMS scheduling information to the DeNB 10 and the RN 11. In a step S802, the MBMS data control unit 15 (forwarding unit 152) transmits MBMS data to the RN 11 with a sufficient margin time before the transmission timing based on the MBMS scheduling information and the internal processing time (T1) of the RN 11. In a step S803, the MBMS data control unit 15 (forwarding unit 152) transmits the MBMS data to the DeNB 10. Note that in general, the transmission of MBMS data is performed by using IP multicast. In such cases, the step S803 may be performed simultaneously with the step S802.

Other Illustrative Embodiments

In the first to fifth illustrative embodiments, specific examples using EPS/E-UTRAN are explained. However, the technique described in these illustrative embodiments, i.e., the technique for preventing an MBSFN signal that is delayed from a predefined transmission timing from being transmitted from a relay station may be also applied to other types of mobile communication systems.

Any process performed by each apparatus (DeNB 10, RN 11, MBMS service control unit 15) described in the above-described first to fifth illustrative embodiments may be implemented by using an ASIC (Application Specific Integrated Circuit), a DSP (Digital Signal Processor), an MPU (Micro Processing Unit), a CPU (Central Processing Unit), or a computer system including a combination thereof. Specifically, a program including a group of instructions relating to the processing procedure of each apparatus explained above with reference to a sequence chart or a flowchart may be executed by a computer system.

This program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Further, the present invention is not limited to the above-described illustrative embodiments, and needless to say, various modifications can be made without departing from the spirit and scope of the present invention described above.

This application is based upon and claims the benefit of priority from Japanese patent application No. 2009-246380, filed on Oct. 27, 2009, the disclosure of which is incorporated herein in its entirety by reference. Reference Signs List

REFERENCE SIGNS LIST

10 BASE STATION (eNB)
11 RELAY STATION (RN: Relay Node)
12 MOBILE STATION BELONGING TO RELAY STATION (RN-UE)
13 MOBILE STATION BELONGING TO BASE STATION (eNB-UE)
15 MBMS SERVICE CONTROL UNIT
100 BASE STATION CELL (eNB CELL)
110 RELAY STATION CELL (RN CELL)
101 RADIO COMMUNICATION UNIT
102 TRANSMISSION DATA PROCESSING UNIT
103 RECEPTION DATA PROCESSING UNIT
104 COMMUNICATION UNIT
105 SCHEDULING CONTROL UNIT
111 ACCESS LINK RADIO COMMUNICATION UNIT
112 DOWNLINK DATA PROCESSING UNIT
113 UPLINK DATA PROCESSING UNIT
114 BACKHAUL LINK RADIO COMMUNICATION UNIT
115 SCHEDULING CONTROL UNIT
151 MBMS CONTROLLER
152 FORWARDING UNIT
215 SCHEDULING UNIT
216 BYPASS SIGNAL LINE

The invention claimed is:

1. A mobile communication system comprising a first base station and a relay station that relays a radio signal between the first base station and a mobile station, wherein
the first base station is configured to (i) transmit, in a first frame, a first radio signal into which transfer information to be transmitted to the mobile station through the relay station is encoded, and (ii) transmit, in a second frame, a second radio signal into which first multicast information to be received by a plurality of nodes is encoded, at a transmission timing synchronized with that of a neighbor base station, and
the relay station is configured to be able to receive the first radio signal, and is also configured such that (i) when the transfer information encoded into the first radio signal is unicast information addressed to the mobile station, the relay station decodes the unicast information from the first radio signal and transmits a third radio signal into which the unicast information is encoded to the mobile station, and (ii) when the transfer information encoded into the first radio signal is second multicast information having a same content as that of the first multicast information, the relay station is able to omit decoding the second multicast information from the first radio signal.

2. The mobile communication system according to claim 1, wherein the relay station is further configured to stop transmission of a radio signal into which the unicast information is encoded to the mobile station at the transmission timing.

3. The mobile communication system according to claim 1, wherein the relay station is further configured to receive the second radio signal transmitted from the first base station at the transmission timing, and to amplify and re-transmit the second radio signal without decoding the first multicast information from the second radio signal.

4. The mobile communication system according to claim 1, wherein the relay station further configured to stop downlink transmission using a same radio resource as that of the second radio signal at the transmission timing.

5. The mobile communication system according to claim 1, wherein the relay station further configured to determine whether or not to transmit a third radio signal generated by re-encoding the second multicast information decoded from the first radio signal to the mobile station depending on whether or not the relay station can transmit the third radio signal in synchronization with the transmission timing.

6. The mobile communication system according to claim 5, wherein the relay station determines whether or not to transmit the third radio signal based on a margin time between an acquisition time of the second multicast information decoded from the first radio signal and the transmission timing.

7. The mobile communication system according to claim 6, wherein when the margin time exceeds a predetermined threshold, the relay station performs the transmission of the third radio signal.

8. The mobile communication system according to claim 7, wherein the threshold is determined based on a processing time required to generate a bit sequence of a physical channel by performing re-encoding for the second multicast information and to generate the third radio signal by performing a modulation process for the bit sequence.

9. The mobile communication system according to claim 1, wherein the relay station receives, through the first base station, scheduling information for determining a timing of the second radio signal transmission performed by the first base station.

10. The mobile communication system according to claim 1, wherein the second multicast information is MBMS (Multimedia Broadcast multicast service) data or an MCH (Multicast Channel) containing MBMS data specified by 3GPP (3rd Generation Partnership Project).

11. A mobile communication system comprising a first base station and a relay station that relays a radio signal between the first base station and a mobile station, wherein
the first base station is configured to (i) transmit, in a first frame, a first radio signal into which unicast information to be transmitted to the mobile station through the relay station is encoded, and (ii) transmit, in a second frame, a second radio signal into which multicast information to be received by a plurality of nodes is encoded, at a transmission timing synchronized with that of a neighbor base station, and
the relay station is configured to (i) upon receiving the first radio signal transmitted in the first frame, decode the unicast information from the first radio signal and transmit a third radio signal into which the unicast information is encoded to the mobile station, and (ii) upon receiving the second radio signal transmitted in the second frame, amplify and re-transmit the second radio signal without decoding the multicast information from the second radio signal.

12. The mobile communication system according to of claim 11, wherein the relay station receives, through the first base station, scheduling information for determining a timing of the second radio signal transmission performed by the first base station.

13. A mobile communication system comprising a first base station and a relay station that receives a radio signal transmitted from the first base station and relays the received radio signal to a mobile station, wherein
the first base station is configured to (i) transmit, in a first frame, a first radio signal into which transfer information to be transmitted to the mobile station through the relay station is encoded, and (ii) transmit, in a second frame, a second radio signal into which first multicast information to be received by a plurality of nodes is encoded, at a transmission timing synchronized with that of a neighbor base station,
the transfer information includes second multicast information having a same content as that of the first multicast information,
the relay station is configured to transmit, to the mobile station, a third radio signal into which the second multicast information decoded from the first radio signal is re-encoded, in synchronization with the transmission timing, and
the first base station transmits the second radio signal into which the first multicast information is encoded after a margin time has passed from transmitting the first radio signal into which the second multicast information is encoded, the margin time is longer than a processing time required for relay processing of the second multicast information performed by the relay station.

14. The mobile communication system according to claim 13, wherein the relay station receives, through the first base station, scheduling information for determining the transmission timing.

15. A mobile communication system comprising a first base station and a relay station that relays a radio signal between the first base station and a mobile station, wherein
the first base station is configured to (i) transmit, in a first frame, a first radio signal into which transfer information to be transmitted to the mobile station through the relay station is encoded, and (ii) transmit, in a second frame, a second radio signal into which first multicast information to be received by a plurality of nodes is encoded, at a transmission timing synchronized with that of a neighbor base station,
the relay station is configured to (i) receive the first radio signal transmitted in the first frame, decode the transfer information from the first radio signal, and transmit a third radio signal into which the transfer information is encoded to the mobile station, and
the transfer information includes unicast information addressed to the mobile station and does not include the multicast information that needs to be transmitted in synchronization with the transmission timing.

16. The mobile communication system according to claim 15, wherein the relay station is further configured to stop transmission of a radio signal into which the transfer information is encoded to the mobile station at the transmission timing.

17. The mobile communication system according to claim 15, wherein the relay station is further configured to receive the second radio signal transmitted from the first base station at the transmission timing, and to amplify and re-transmit the second radio signal without decoding the multicast information from the second radio signal.

18. The mobile communication system according to claim 16, wherein the relay station receives, through the first base station, scheduling information for determining a timing of the second radio signal transmission performed by the first base station.

19. A relay station apparatus that relays a radio signal between a first base station and a mobile station, wherein
the first base station is configured to (i) transmit, in a first frame, a first radio signal into which transfer information to be transmitted to the mobile station through the relay station apparatus is encoded, and (ii) transmit, in a second frame, a second radio signal into which first multicast information to be received by a plurality of nodes is encoded, at a transmission timing synchronized with that of a neighbor base station,
the relay station apparatus comprises:
first communication processor being able to receive the first radio signal;
downlink data processor being able to decode the transfer information from the first radio signal received by the first communication processor, and generate a third radio signal into which the transfer information is re-encoded; and
second communication processor being able to transmit the third radio signal to the mobile station, and
the downlink data processor is adapted such that (i) when the transfer information is unicast information addressed to the mobile station, the downlink data processor decodes the unicast information from the first radio signal, and (ii) when the transfer information encoded into the first radio signal is second multicast information having a same content as that of the first multicast information, the downlink data processor is able to omit decoding the second multicast information from the first radio signal.

20. The relay station apparatus according to claim 19, wherein the second communication processor is further able to stop transmission of a radio signal into which the unicast information is encoded to the mobile station at the transmission timing.

21. The relay station apparatus according to claim 19, wherein
the first communication processor is further able to receive the second radio signal transmitted at the transmission timing, and
the second communication processor is further able to amplify and re-transmit the second radio signal without going through a process of decoding the first multicast information from the second radio signal.

22. The relay station apparatus according to claim 19, wherein the second communication processor further able to stop downlink transmission using a same radio resource as that of the second radio signal at the transmission timing.

23. The relay station apparatus according to claim 19, wherein when the transfer information includes second multicast information having a same content as that of the first multicast information, the downlink data processor generates the third radio signal containing the re-encoded second multicast information on condition that the third radio signal can be transmitted in synchronization with the transmission timing.

24. The relay station apparatus according to claim 23, wherein whether or not to generate the third radio signal containing the re-encoded second multicast information is determined based on a margin time between an acquisition time of the second multicast information decoded from the first radio signal and the transmission timing.

25. The relay station apparatus according to claim 24, wherein the third radio signal containing the re-encoded second multicast information is generated when the margin time exceeds a predetermined threshold.

26. The relay station apparatus according to claim 25, wherein the threshold is determined based on a processing time required to generate a bit sequence of a physical channel by performing re-encoding for the second multicast information and to generate the third radio signal by performing a modulation process for the bit sequence.

27. The relay station apparatus according to claim 19, wherein the first communication processor receives, through the first base station, scheduling information for determining a timing of the second radio signal transmission performed by the first base station.

28. A relay station apparatus that relays a radio signal between a first base station and a mobile station, comprising:
first communication processor being able to receive a first radio signal into which unicast information to be transmitted to the mobile station is encoded and which is transmitted from the first base station in a first frame, and receive a second radio signal into which multicast information to be received by a plurality of nodes is encoded and which is transmitted from the first base station in a second frame at a transmission timing synchronized with that of a neighbor base station;
downlink data processor being able to decode the unicast information from the first radio signal received by the first communication processor, and generate a third radio signal into which the unicast information is re-encoded; and
second communication processor being able to transmit the third radio signal to the mobile station, and amplify and re-transmit the second radio signal without going through a process of decoding the multicast information from the second radio signal.

29. The relay station apparatus according to claim 28, wherein he second multicast information is MBMS (Multimedia Broadcast multicast service) data or an MCH (Multicast Channel) containing MBMS data specified by 3GPP (3rd Generation Partnership Project).

30. A base station apparatus configured to:
(i) transmit, in a first frame, a first radio signal into which transfer information to be transmitted to the mobile station through the relay station is encoded; and
(ii) transmit, in a second frame, a second radio signal into which first multicast information to be received by a plurality of nodes is encoded, at a transmission timing synchronized with that of a neighbor base station, wherein
the transfer information includes second multicast information having a same content as that of the first multicast information, and
the base station transmits the second radio signal into which the first multicast information is encoded after a margin time has passed from transmitting the first radio signal into which the second multicast information is encoded, earlier than the margin time is longer than a processing time required for relay processing of the second multicast information performed by the relay station.

31. A radio relay method performed by a relay station that relays a radio signal between a first base station and a mobile station, wherein
the first base station is configured to (i) transmit, in a first frame, a first radio signal into which transfer information to be transmitted to the mobile station through the relay station is encoded, and (ii) transmit, in a second frame, a second radio signal into which first multicast information to be received by a plurality of nodes is encoded, at a transmission timing synchronized with that of a neighbor base station, and
the method comprises:
(a) receiving the first radio signal;
(b) when the transfer information encoded into the received first radio signal is unicast information addressed to the mobile station, decoding the unicast information and generating a third radio signal into which the unicast information is re-encoded;
(c) when the transfer information encoded into the first radio signal is second multicast information having a same content as that of the first multicast information, omitting decoding the second multicast information from the first radio signal; and
(d) transmitting the third radio signal to the mobile station.

32. The method according to claim 31, further comprising stopping transmission of a radio signal into which the unicast information is encoded to the mobile station at the transmission timing.

33. The method according to claim 31, further comprising:
receiving the second radio signal transmitted from the first base station at the transmission timing, and
amplifying and re-transmitting the second radio signal without decoding the first multicast information from the second radio signal.

34. The method according to claim 31, further comprising stopping downlink transmission using a same radio resource as that of the second radio signal at the transmission timing.

35. The method according to claim 31, further comprising:
determining whether or not to transmit the third radio signal generated by re-encoding the second multicast information decoded from the first radio signal should to the mobile station depending on whether or not the third radio signal can be transmitted in synchronization with the transmission timing; and generating the third radio signal containing the re-encoded second multicast information on condition that the third radio signal can be transmitted in synchronization with the transmission timing.

36. A radio relay method performed in a relay station that relays a radio signal between a first base station and a mobile station, the method comprising:

receiving a first radio signal into which unicast information to be transmitted to the mobile station is encoded and which is transmitted from the first base station in a first frame;

decoding the unicast information from the received first radio signal, and generating a third radio signal into which the unicast information is re-encoded;

transmitting the third radio signal to the mobile station;

receiving a second radio signal into which multicast information to be received by a plurality of nodes is encoded and which is transmitted from the first base station in a second frame at a transmission timing synchronized with that of a neighbor base station; and amplifying and re-transmitting the second radio signal without going through a process of decoding the multicast information from the second radio signal.

37. A non-transitory computer readable medium storing a program that causes a computer to perform signal processing relating to a relay station that relays a radio signal between a first base station and a mobile station, wherein the first base station is configured to (i) transmit, in a first frame, a first radio signal into which transfer information to be transmitted to the mobile station through the relay station apparatus is encoded, and (ii) transmit, in a second frame, a second radio signal into which first multicast information to be received by a plurality of nodes is encoded, at a transmission timing synchronized with that of a neighbor base station, and the signal processing comprises:

(a) when the transfer information encoded into the first radio signal received by the relay station is unicast information addressed to the mobile station, decoding the unicast information and generating a digital transmission signal into which the unicast information is re-encoded; and (b) when the transfer information encoded into the first radio signal is second multicast information having a same content as that of the first multicast information, omitting decoding the second multicast information.

* * * * *